Nov. 19, 1929.  E. R. LINDSTROM  1,736,162
BRUSH MAKING MACHINE
Filed Oct. 5, 1927   12 Sheets-Sheet 6
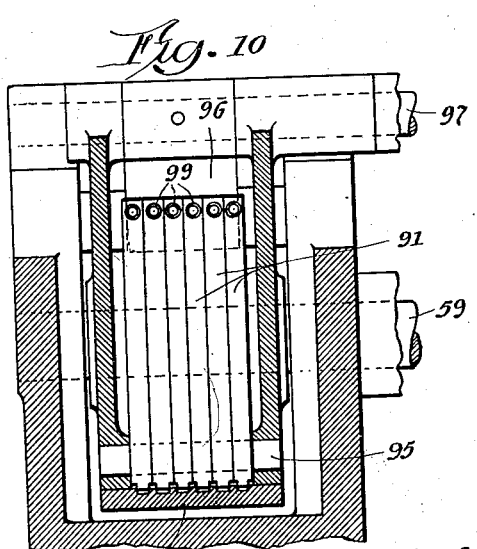
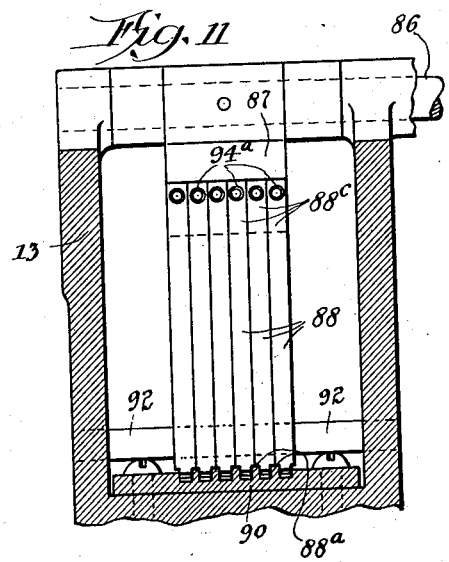
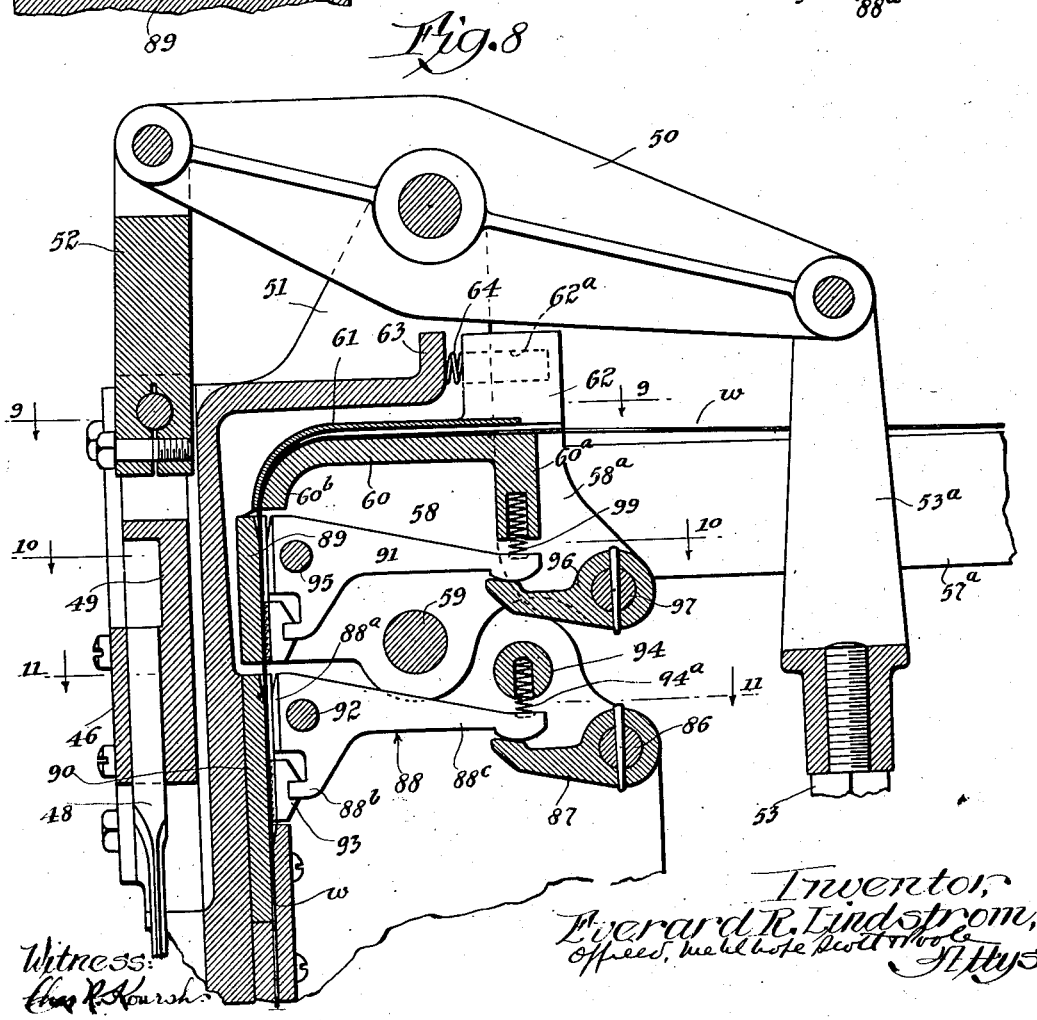

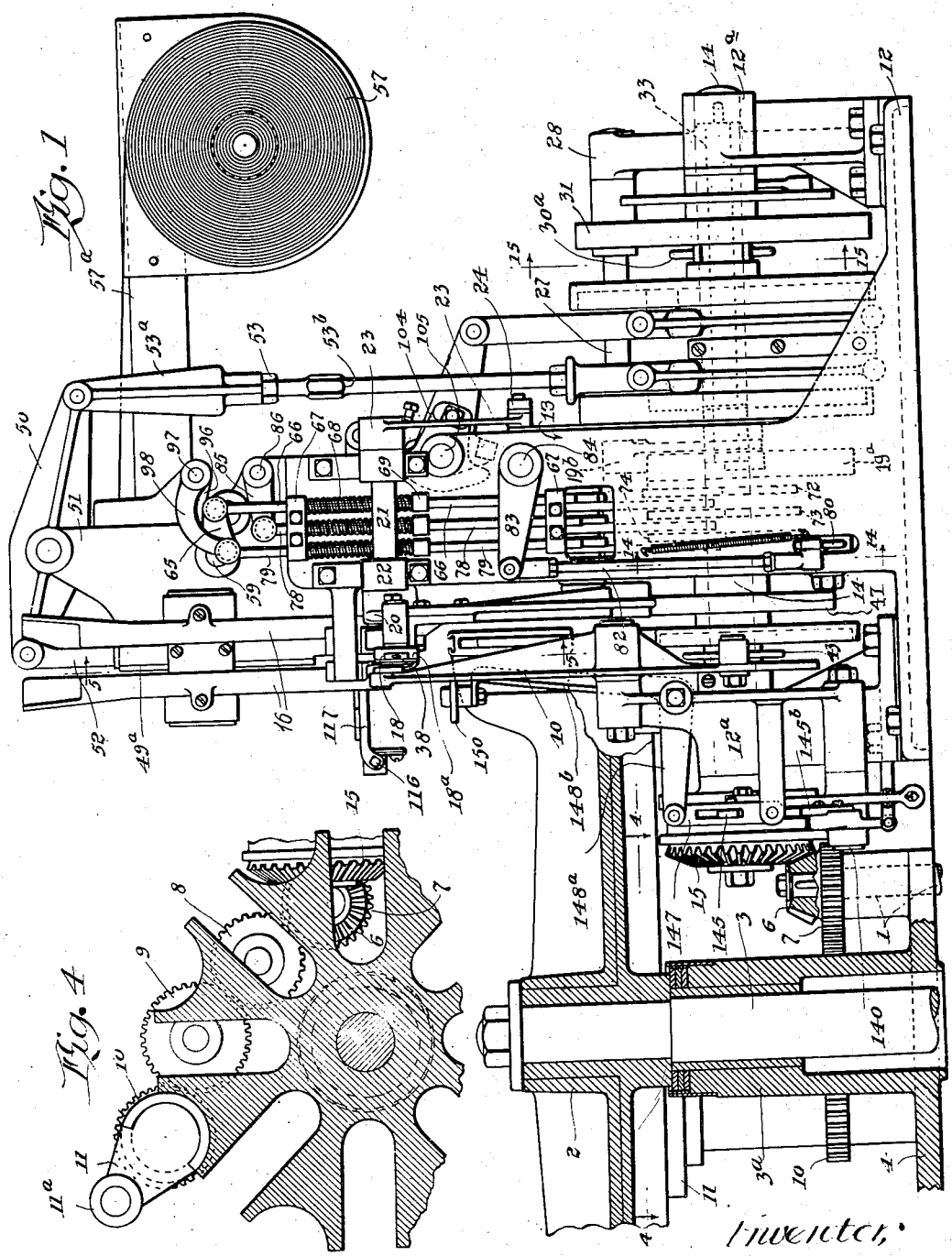

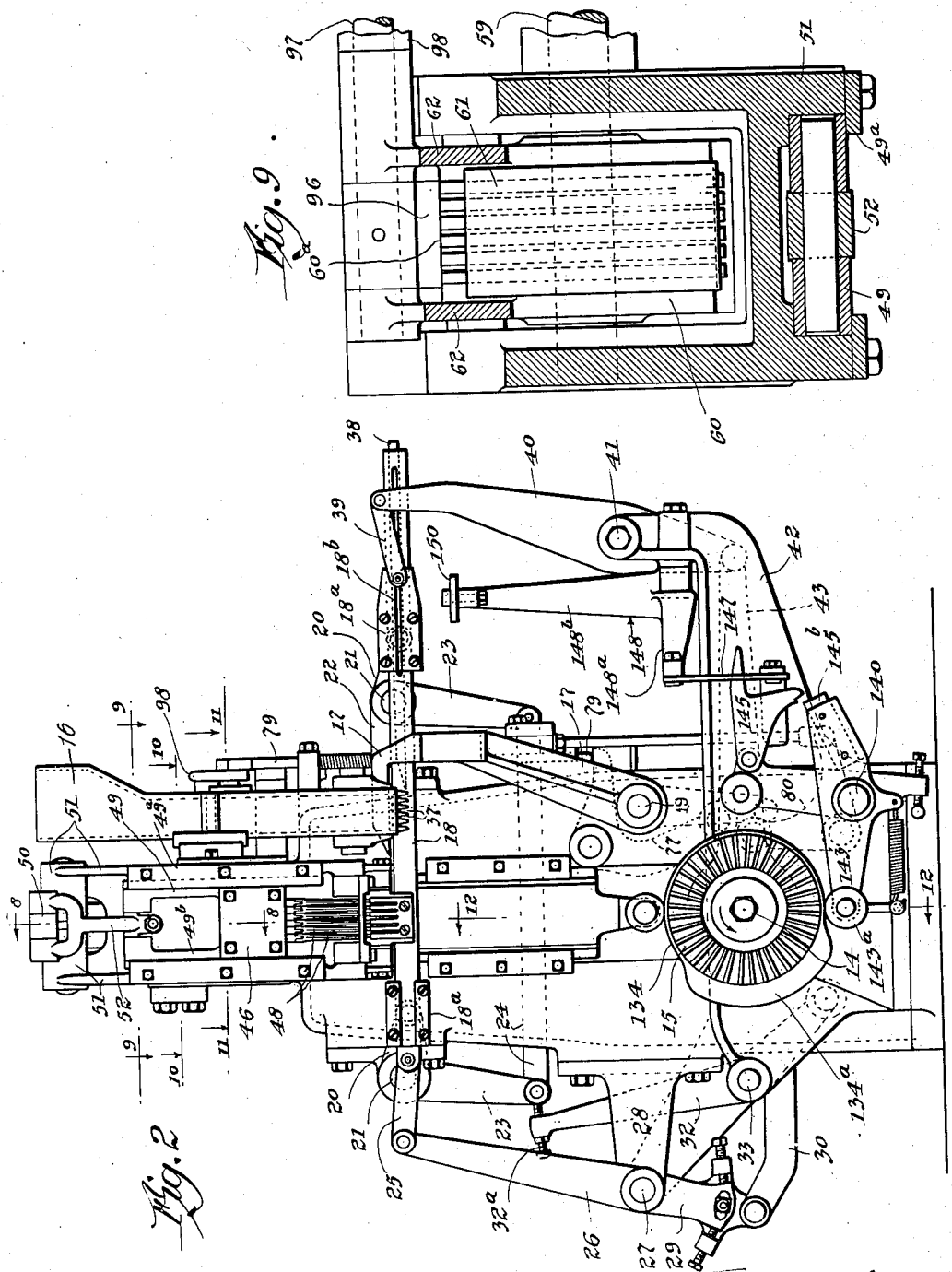

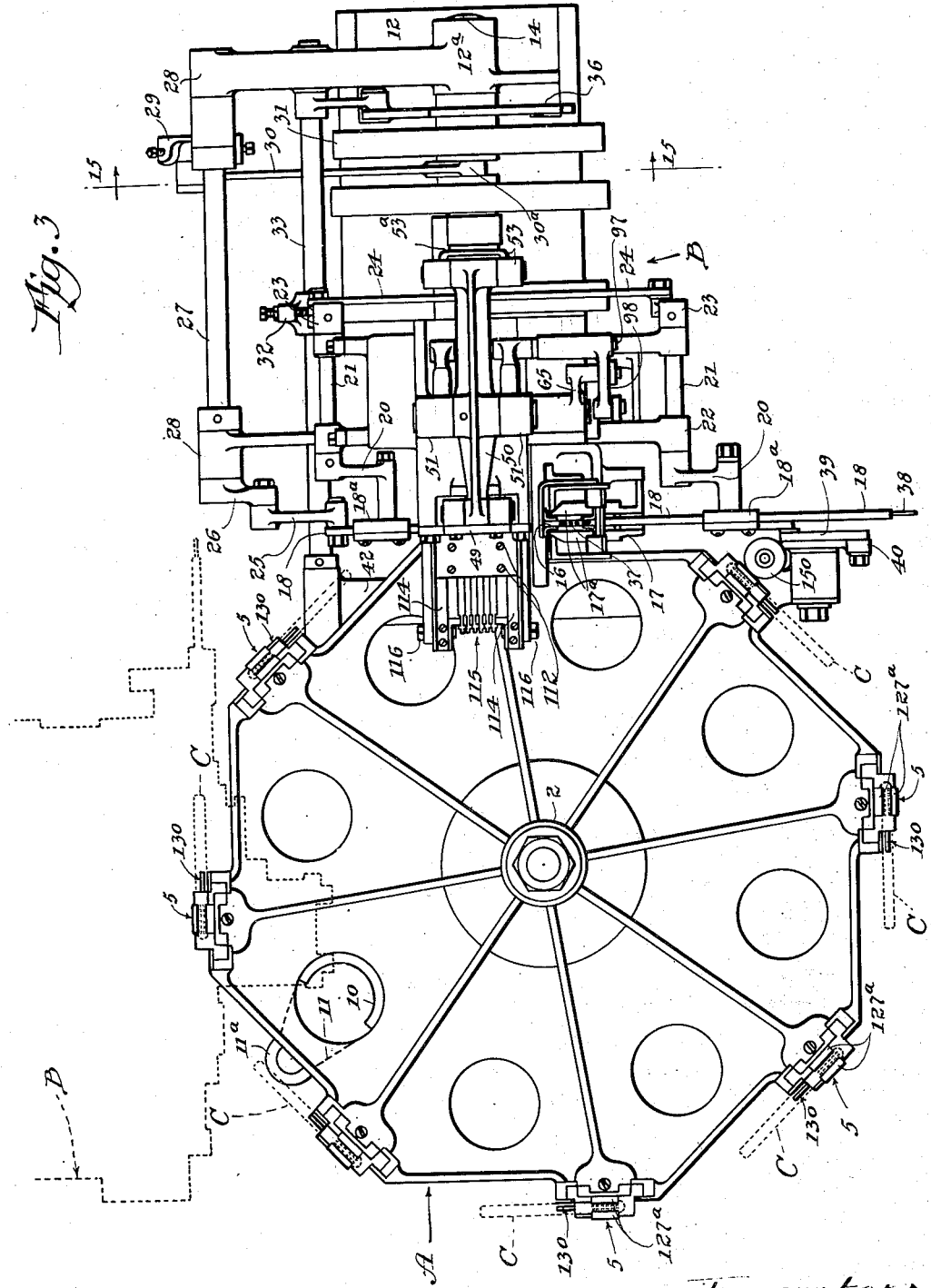

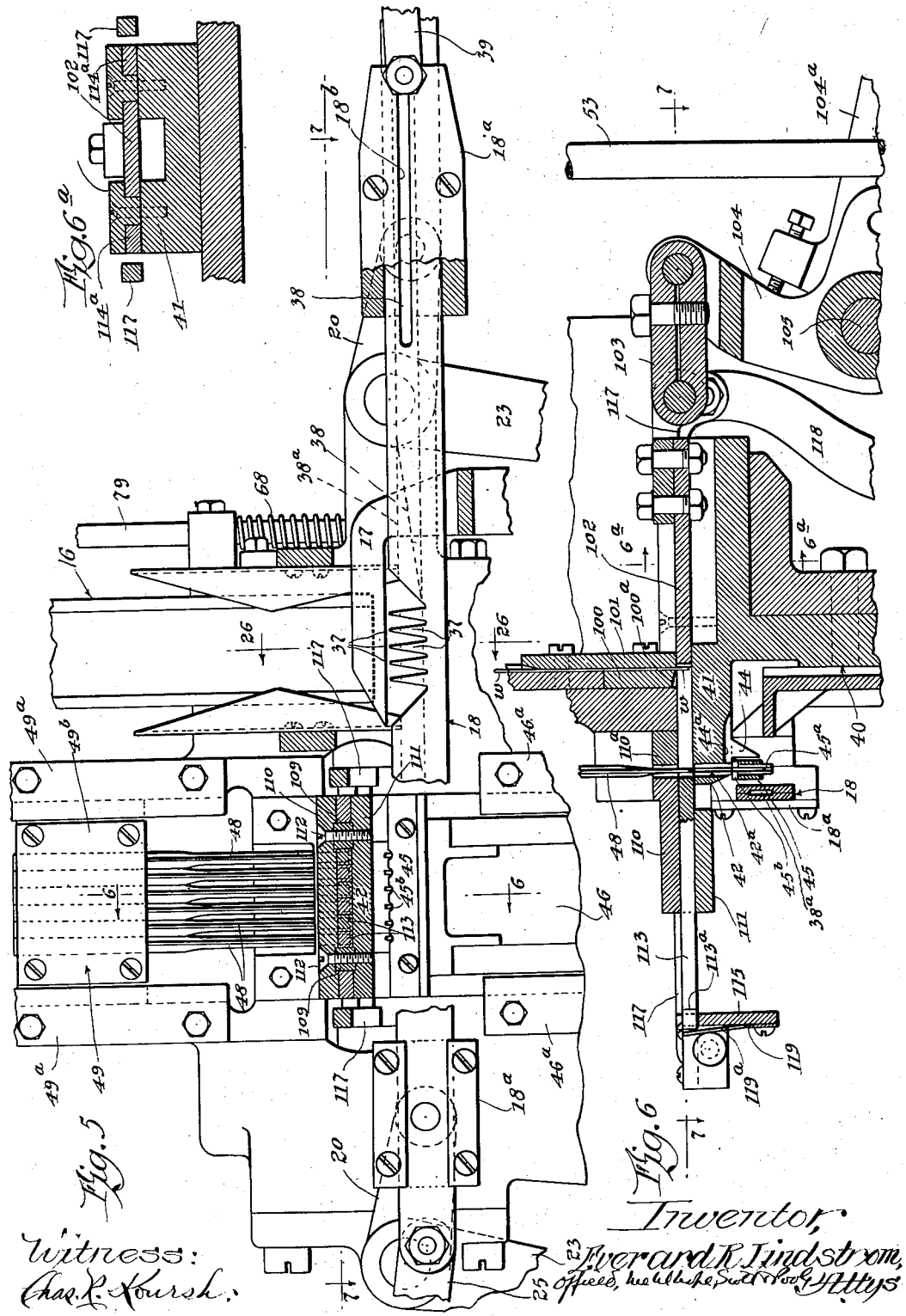

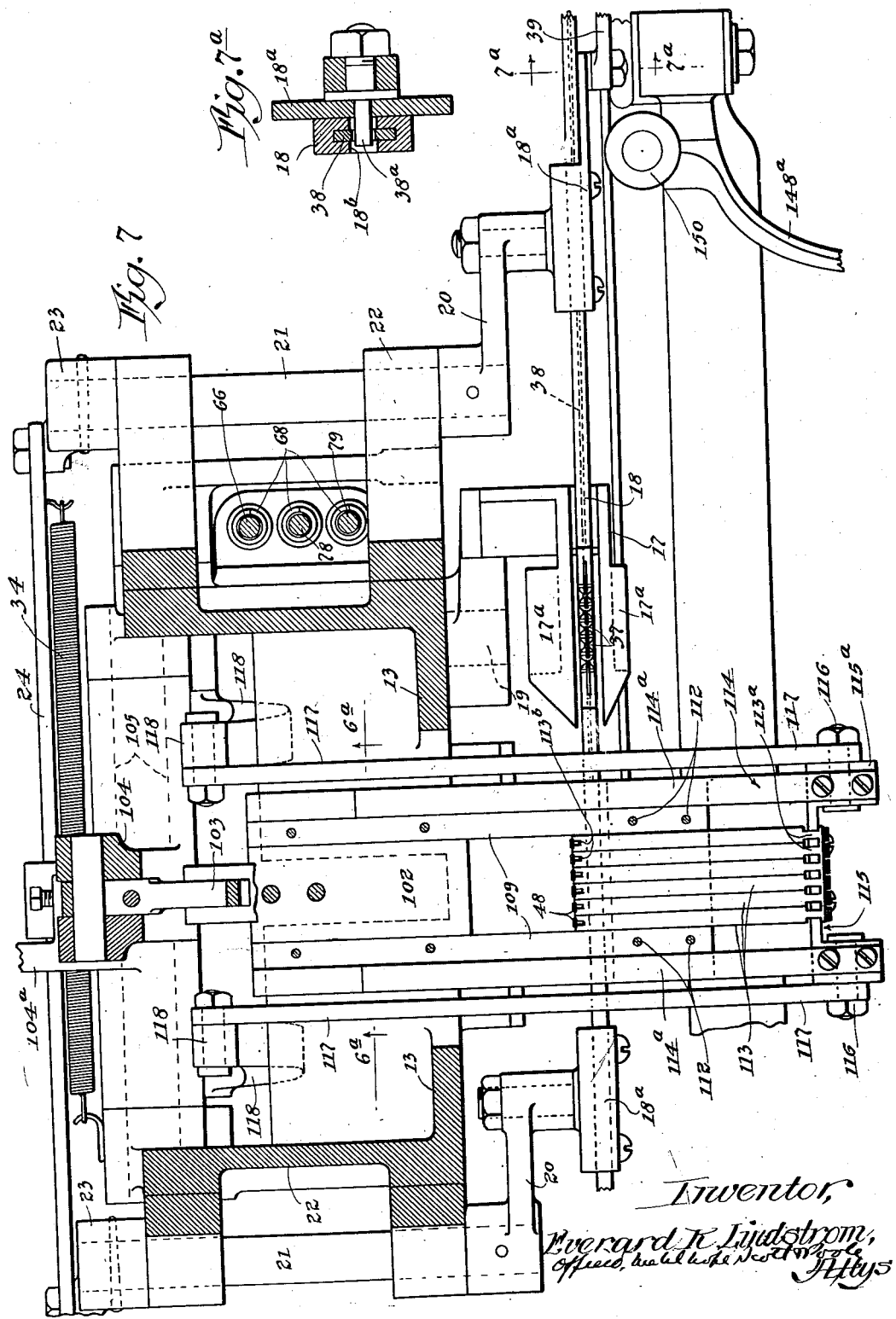

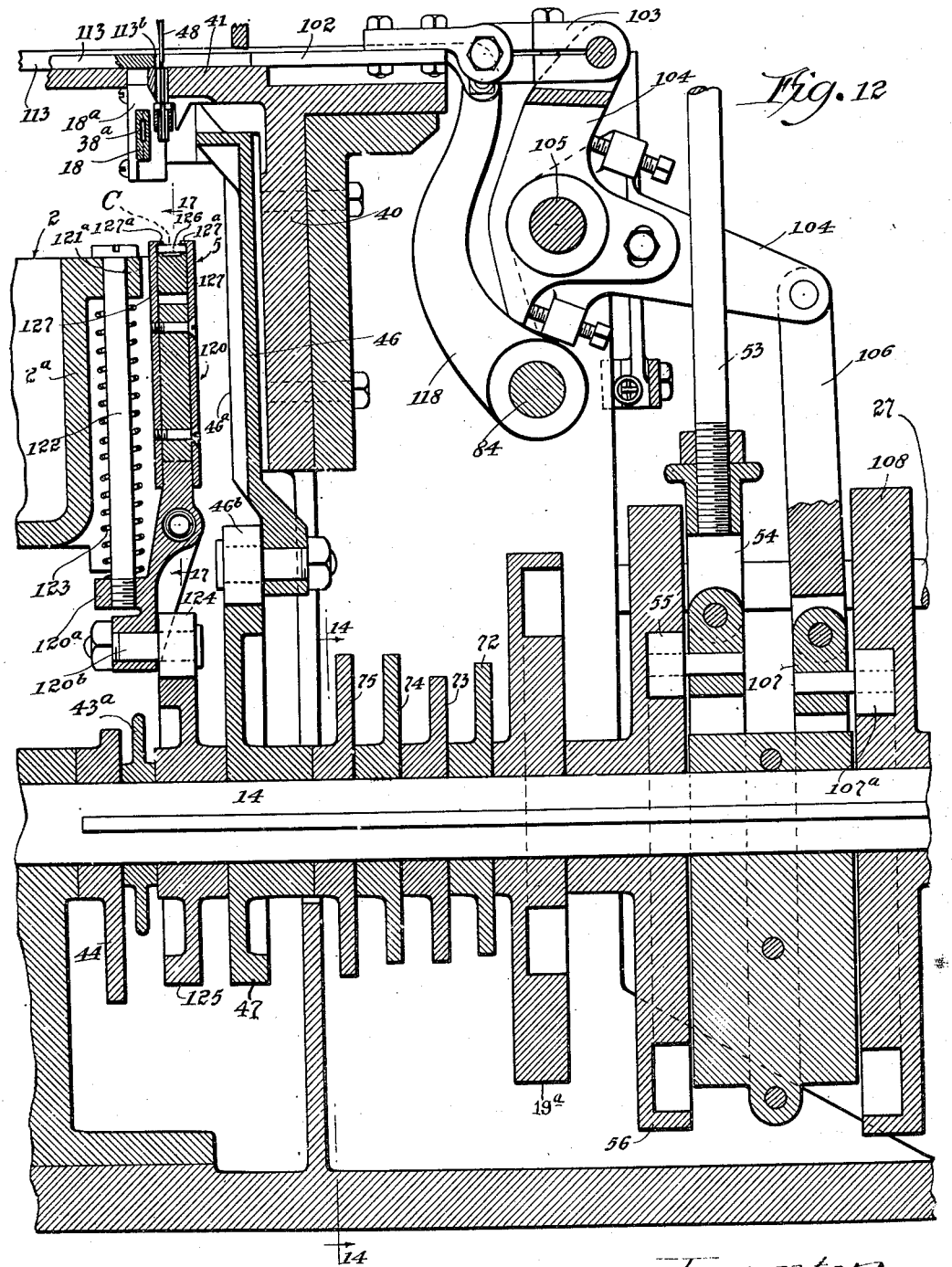

Nov. 19, 1929.     E. R. LINDSTROM     1,736,162
BRUSH MAKING MACHINE
Filed Oct. 5, 1927     12 Sheets-Sheet 8

Inventor,
Everard R. Lindstrom

Nov. 19, 1929.  E. R. LINDSTROM  1,736,162
BRUSH MAKING MACHINE
Filed Oct. 5, 1927  12 Sheets-Sheet 9
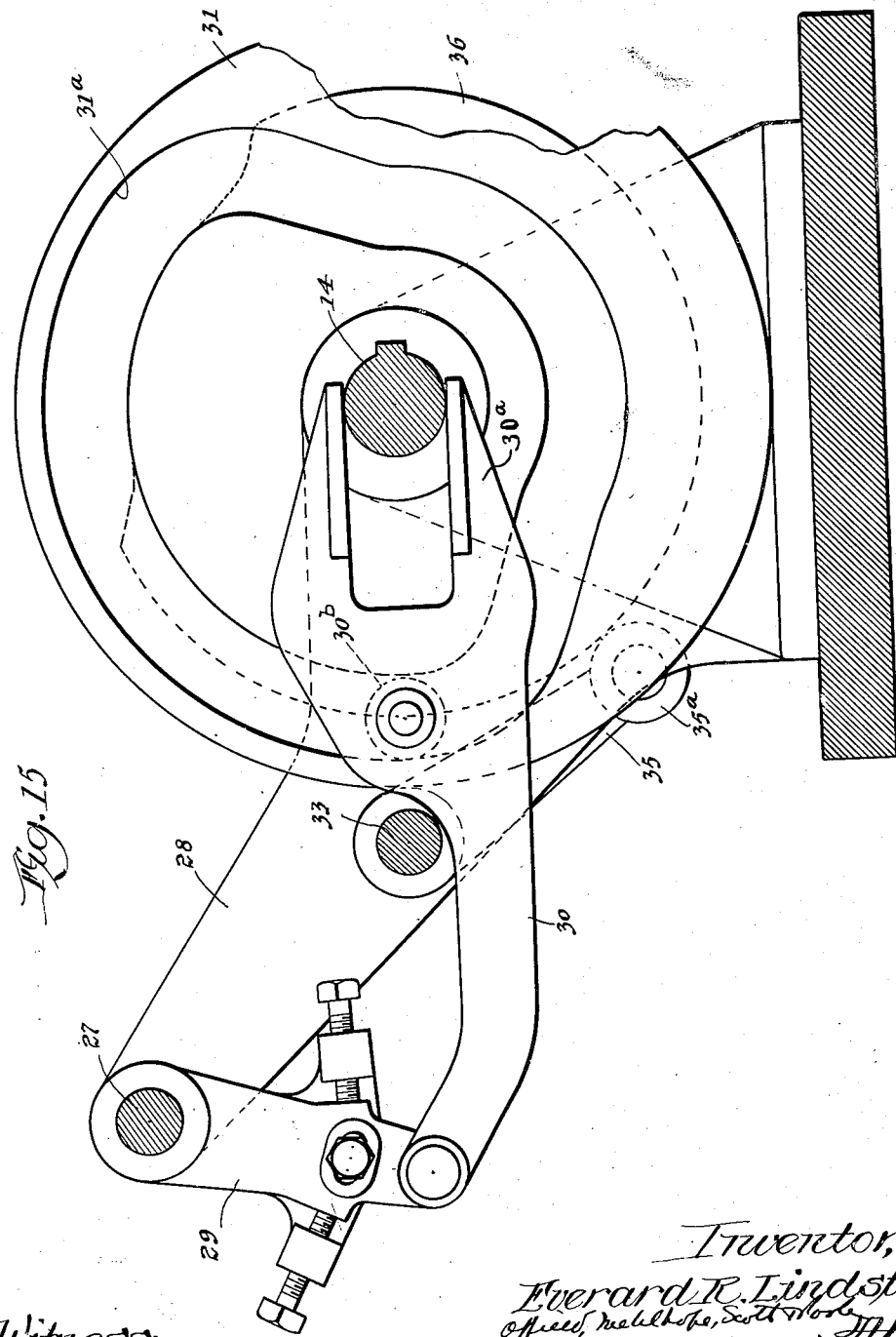

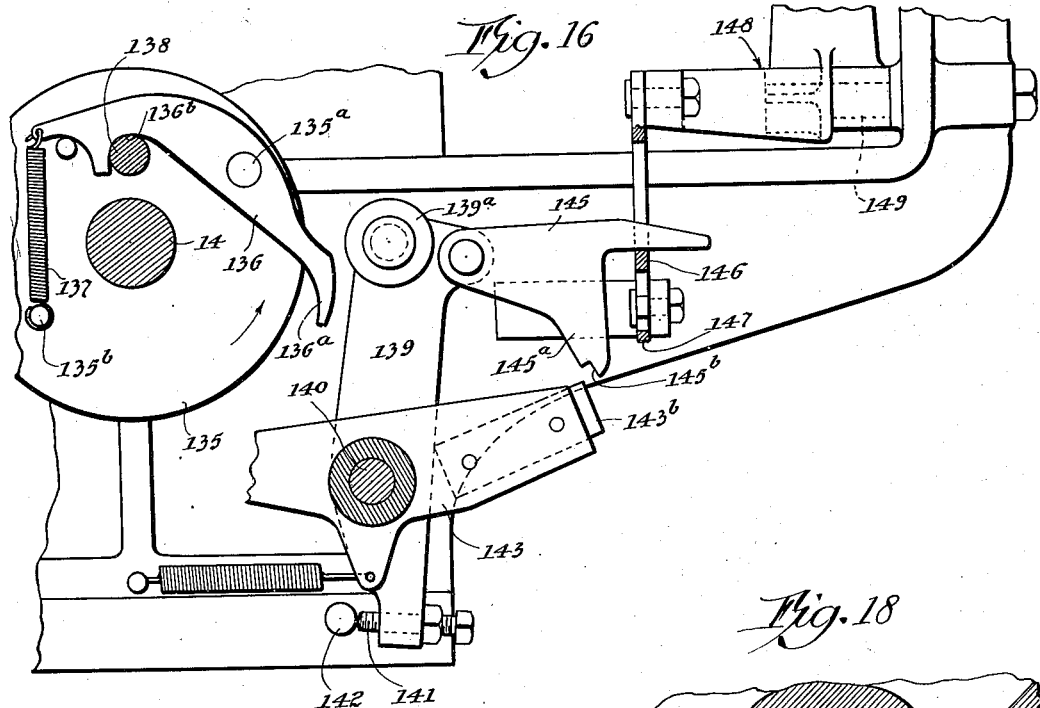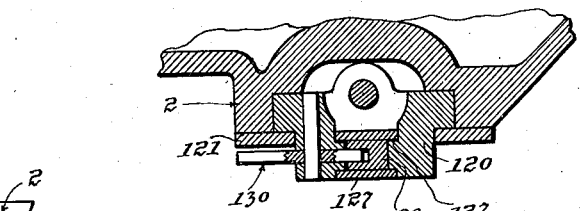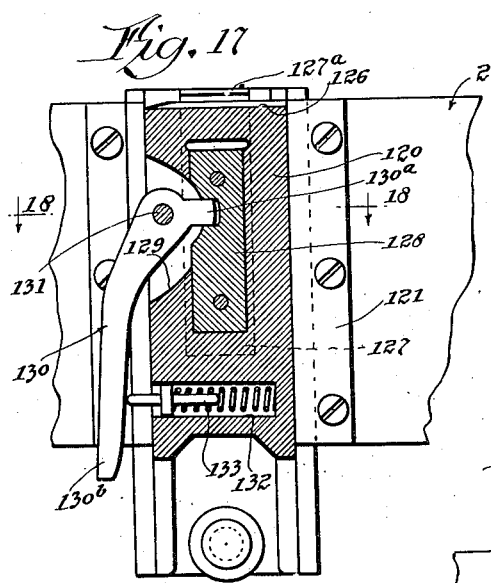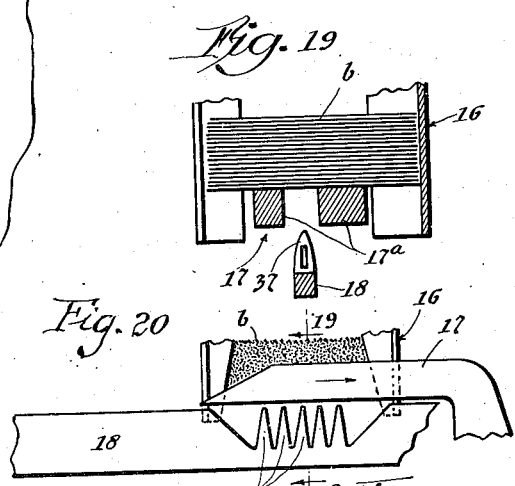

Nov. 19, 1929.    E. R. LINDSTROM    1,736,162
BRUSH MAKING MACHINE
Filed Oct. 5, 1927    12 Sheets-Sheet 11
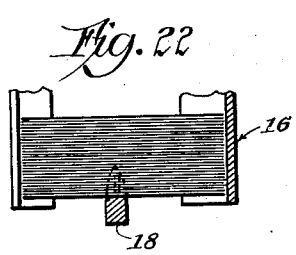
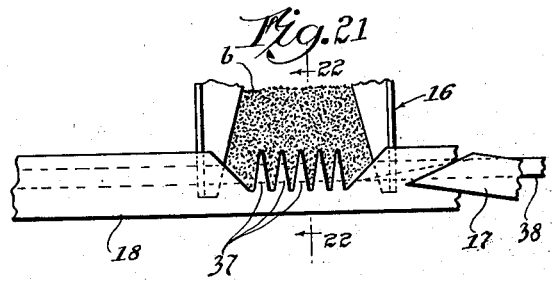
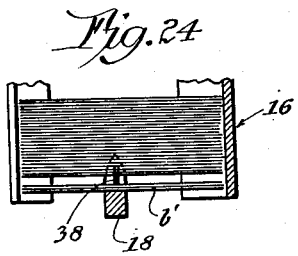
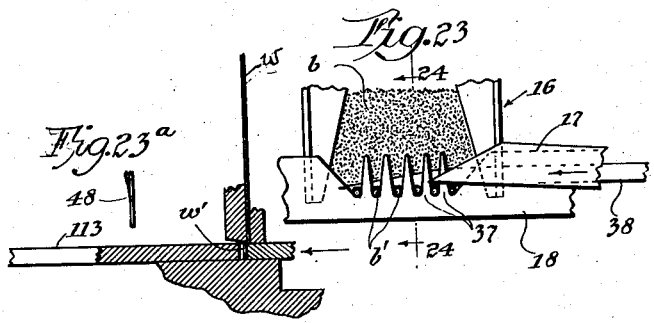
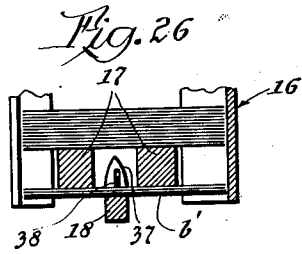
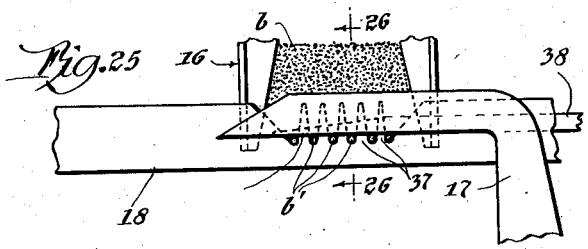
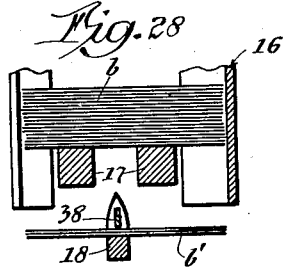
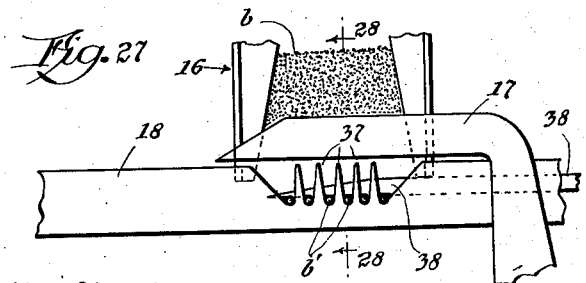
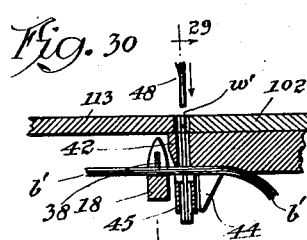
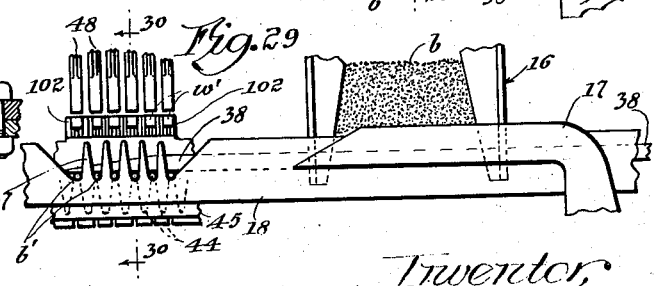

Nov. 19, 1929.  E. R. LINDSTROM  1,736,162
BRUSH MAKING MACHINE
Filed Oct. 5, 1927   12 Sheets-Sheet 12

Witness:
Chas. R. Koursh

Inventor,
Everard R. Lindstrom
Offield, Towle, Linthicum & Poole
Attys.

Patented Nov. 19, 1929

1,736,162

UNITED STATES PATENT OFFICE

EVERARD R. LINDSTROM, OF EVANSTON, ILLINOIS, ASSIGNOR TO AUGUSTUS LEE READ, OF COVINGTON, KENTUCKY

BRUSH-MAKING MACHINE

Application filed October 5, 1927. Serial No. 224,082.

This invention relates to brush making machines, and more particularly to a machine for inserting bristles into the head or body portion of a brush.

A machine designed and constructed in accordance with the present invention is primarily intended for use in the manufacture of tooth brushes, although the same principles of operation may be applied to the manufacture of brushes of other types.

The object of the invention is to provide an automatic machine which will produce the finished articles at a largely increased rate of production and at a consequently lower cost than has heretofore been possible with machines available for the purpose and which at best are only capable of performing separate operations.

The machine herein disclosed is believed to be unique in the art owing to the degree to which the automatic features have been developed, as witness the fact that the only manual operations are the feeding of the brush blanks to the machine, the discharge of the finished brushes therefrom, and maintaining a supply of bristles in a magazine, although it is contemplated that even the feeding and discharging operations may be readily accomplished by automatic means. The blanks are preferably stamped from suitable sheet materials, in this instance an especially heavy grade of fibre board with rows of holes or recesses in the head portion to receive the bristles. The machine does not stamp the handle blanks.

A comprehensive conception of the functions performed by the machine may be had by first considering the finished brush. It consists of the flat handle portion and a head in which two rows of bristle tufts are set, each tuft consisting of a number of bristle strands bent double to form a looped end which is inserted into the hole or recess in the head, and locked in place by a short metal bar or key which is pressed edgewise into the head, crosswise each hole or recess and between the looped portions of the tuft within said recess. The bristles are fed to the machine from a magazine or hopper to which batches of straight bristles are supplied from time to time.

Briefly, a single cycle of operation comprises the following sequence of steps: A layer of bristles is removed from the bottom of the magazine, separated into groups of an equal number of strands, and thence carried laterally into the path of a group of setting needles which drive the keys or lock bars (fed in the form of a flexible strip from a reel and thence cut into short lengths) downwardly, at the same time engaging the midpoints of the bristle strands, bending them into loop form as they are carried into the holes of the blank below waiting to receive them, and secured by the embedding of the bars in the head of the blank.

As will be presently seen, a single row of tufts (six in number in the present instance) are set in a single operation. But the brush as made, has a double row of tufts so that it is preferred to repeat the same setting operation by advancing the blank with one row of bristles set to another setting head,—a duplicate of the first,—which sets the second row of bristles. However, in adopting the method of setting the rows in successive operations, do not ignore the fact that the entire operation of tufting the brush may be readily carried out in one operation.

For brevity of description and illustration, therefore, a single tufting head or unit has been disclosed, it being understood that another head would constitute a complete machine for tufting a brush with two rows of bristles. As will be presently seen, the brush carrier is a polygonal platform or turret rotating about a vertical axis and driven with an intermittent stop motion so that assuming that the first tufting head were located in a certain position, the second would be spaced 90° from the first head in the direction of the movement of the carrier. Furthermore, it may be stated that the handle blanks are advanced step by step practically throughout a complete revolution of the carrier, coming to rest momentarily in a series of positions or stations. It is during these positions of rest that the bristles are set, the blanks fed to the carrier and the finished brushes removed.

Also, other finishing operations may be accomplished after each brush has been tufted and before it is discharged from the carrier, such as trimming the tufts or covering the handle with a finishing coat. However, these devices would be in the nature of auxiliaries and do not form an essential part of the machine, the novelty of which is embodied in a single tufting or bristle setting unit cooperating with the turret.

Finally, it may be explained that in common with a large variety of automatic machines, various forms of well-known mechanical movements are employed, as for instance, cams, rock shafts, levers and linkages of various types, all well known agencies for imparting the desired movement and timing of the part actuated thereby. For this reason, it is proposed to omit detailed descriptions of each mechanical movement employed other than to trace its origin and define its nature, and for the further reason that such movements are all within the realm of the skilled machine designer.

Referring to the accompanying drawings showing a preferred embodiment of the invention, Figure 1 is a general view of the machine in side elevation.

Figure 2 is a front view of the machine with the turret removed.

Figure 3 is a top plan view of the machine showing one unit in full and the position of another unit indicated in dotted lines.

Figure 4 is a detail view of the blank feeding turret drive mechanism as taken on line 4—4 of Figure 1.

Figure 5 is an enlarged detail view in front elevation of the bristle-setting head as taken on line 5—5 of Figure 1.

Figure 6 is an enlarged detail view in vertical section through the bristle-setting head as taken on line 6—6 of Figure 5.

Figure 6ª is a detail view in cross section taken on line 6ª—6ª of Figures 6 and 7.

Figure 7 is a view in plan section of the bristle-setting head as taken on line 7—7 of Figures 5 and 6.

Figure 7ª is a detail view in cross section taken on line 7ª—7ª of Figure 7.

Figure 8 is a view in vertical section through the upper portion of the bristle-setting head, showing the wire feeding and gripping members.

Figures 9, 10 and 11 are cross-sectional views taken on lines 9—9, 10—10 and 11—11, respectively, of Figures 2 and 8, respectively.

Figure 12 is an enlarged detail view in vertical section through the lower portion of the bristle-setting head and the arrangement of cams on the cam shaft as taken on line 12—12 of Figure 2, and a continuation of the section below that of Figure 8.

Figure 13:
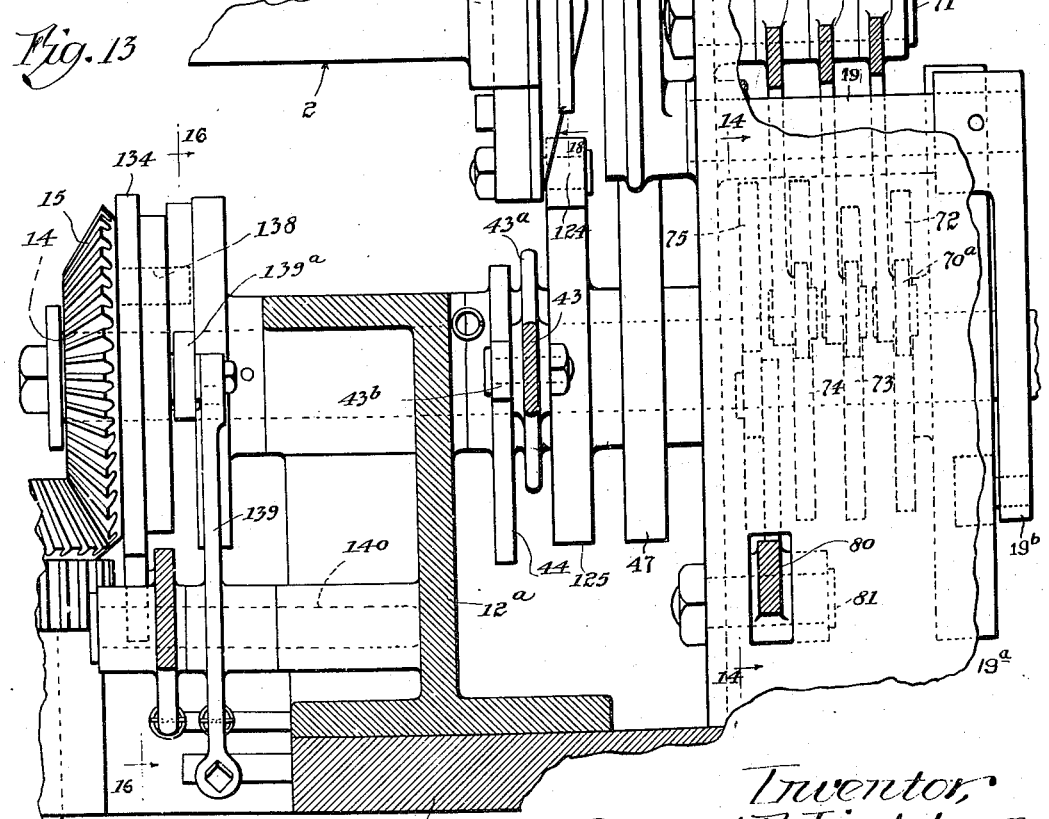
Figure 31:
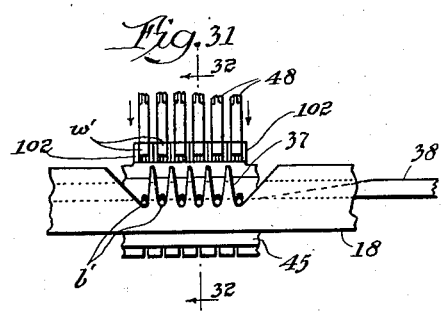

Figure 13 is an enlarged view in side elevation of the forward portion of the cam shaft showing the cam arrangement.

Figure 14:
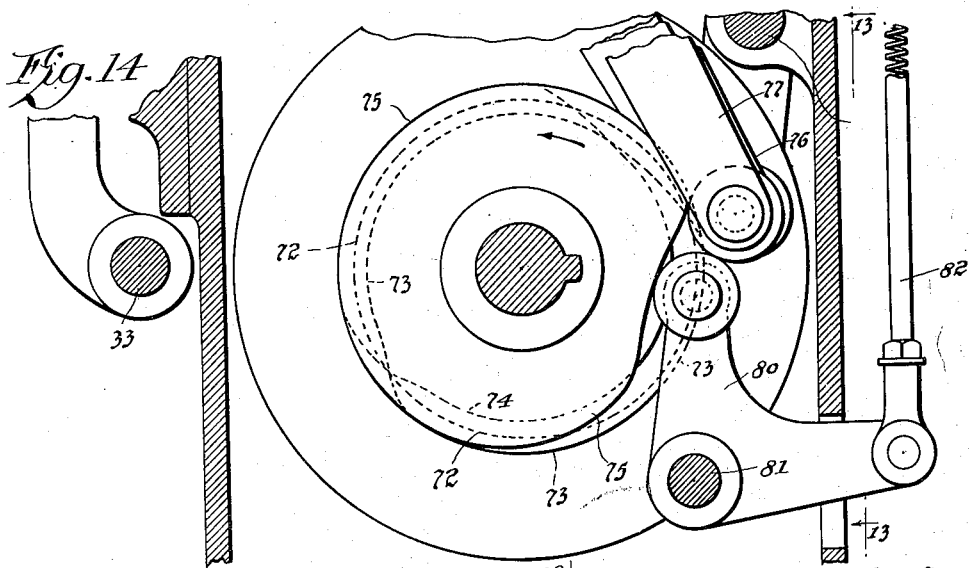

Figure 14 is a cross-sectional view taken on line 14—14 of Figure 13 showing cams mounted on the central portion of the cam shaft.

Figure 15 is an enlarged detail view in transverse section taken on line 15—15 of Figure 3.

Figure 16 is an enlarged detail view in cross section taken on line 16—16 of Figure 13.

Figure 17 is an enlarged sectional view of one of the brush carriers as taken on line 17—17 of Figure 12.

Figure 18 is a cross sectional view of the brush carrier taken on line 18—18 of Figure 17.

Figure 19 is a diagrammatic view in vertical section through the bristle magazine as taken on line 19—19 of Figure 2 showing the parts at the commencement of a bristle separating and feeding stroke.

Figure 20 is a diagrammatic view in front elevation of the lower portion of the bristle magazine and parts associated therewith.

Figures 22, 24, 26 and 28 are diagrammatic views corresponding to Figure 19 and showing the successive positions of the parts during the movement of removing a single row of tufts from the magazine.

Figures 21, 23, 25, 27 and 29 are diagrammatic views corresponding to Figure 20 and showing the successive positions of the parts in front elevation during a single tuft removing operation, Figure 29 also showing the bristle setting mechanism as taken on line 29—29 of Figure 30.

Figure 23ª is a diagrammatic view showing the action of the wire cutter at the instant of cutting, and the severed members being advanced forwardly to the setting mechanism.

Figure 30 is a diagrammatic view in section through the bristle setting mechanism as taken on line 30—30 of Figure 29 including a brush carrier in bristle setting position.

Figures 32, 34, 36 and 38 are diagrammatic views corresponding to Figure 30, showing the successive positions of the parts during a bristle setting stroke.

Figures 31, 33, 35 and 37 are diagrammatic views corresponding to the left-hand portion of Figure 29 and showing the successive positions of the parts in front elevation during a bristle setting stroke.

Figure 39:
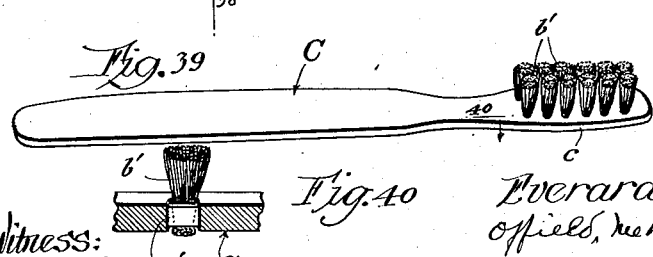

Figure 39 is a perspective view of a finished brush.

Figure 40:
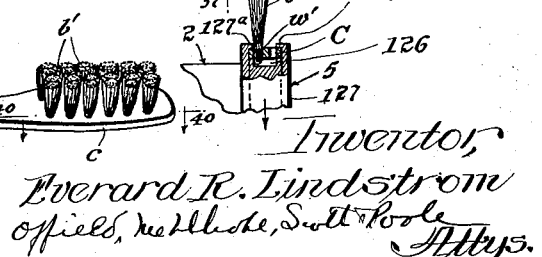

Figure 40 is a detail view in section through a single tuft showing the manner in which it is set in the brush blank.

The brush making machine consists generally of a revolving turret A and one or more bristle setting units B, arranged about the circumference of the turret. As already explained, each unit sets a row of bristle tufts in the head of the brush, although for the purpose of the present disclosure only one unit is shown. Thus in Figure 3, a second unit shown in dotted lines, would be located 90° beyond the first unit in the direction of rotation of the turret, namely, from right to left or counter-clockwise.

The turret and setting unit or units are mounted on a bench or support of table height, both being driven by an electric motor mounted beneath, and connected with a vertical drive shaft 1. The turret comprises a revolving spider 2 fixed to a vertical spindle 3 journalled in a bearing 3ª integral with a base 4 fixed to the machine support. The turret spider is octagonal in shape (Figure 3), and spaced apart at uniform intervals are mounted the brush blank carriers 5. These carriers consist of spring actuated grippers which hold the blanks in fixed position during the bristle setting operation, as will later be described in detail.

The turret revolves with an intermittent stop motion similar to the so-called Geneva movement, so that a blank is presented to the bristle setting mechanism with each advance movement, with an intervening period of rest during which the setting operation is completed. The blanks with the bristles set are advanced through several positions of rest and in one or more of these positions or stations the necessary finishing operations can be accomplished, such as the trimming of the bristles. For the purpose of this disclosure, however, it need only be stated that the blanks are preferably loaded in the carriers at the station 90° in advance of the first setting unit, and the finished brushes unloaded at the station just in advance of the loading station. The loading and unloading consists simply in tripping the grippers and replacing a finished brush with a blank. This can be done either by hand or automatically.

The turret drive is clearly shown in Figures 1 and 4. At the upper end of the drive shaft 1 is a beveled drive pinion 6, and immediately below is the turret drive pinion 7. Meshing with the pinion 7 is a train of three gear wheels 8, 9 and 10, mounted on vertical stub shafts just below the spider 2 (Figure 4). The shaft carrying the last gear wheel 10 also carries a crank 11 at its upper end with a roller 11ª at its end designed to engage a series of radial slots 2ª forming a star wheel on the underside of the spider 2 whereby the desired motion is imparted to the turret.

Referring now to the bristle setting unit B, the same consists of a series of coacting mechanisms functioning in cycles in the performance of the sequence of steps constituting each bristle setting operation in which a single row of bristle tufts are inserted into a blank.

To simplify the description of the mechanisms, it may be well to first identify them according to the functions performed and in the order of their performance. The first mechanism consists of those parts which successively remove from a magazine the required number of bristles for one setting, divides the bristles into tufts and transports them laterally in the form of small bundles of straight bristles to what may be termed the setting position. The next mechanism consists of a group of moving parts which feeds strips of flat wire toward the point of bristle setting, cuts short lengths from the strips to form the bristle locking keys or bars, and moves or slides the keys edgewise to a position in line with the setting needles. And finally, the mechanism consists generally of a vertically reciprocative plunger in which is mounted a set of setting needles which descend, forcing the locking bars and bristle tufts into the holes or recesses in the blank.

These different mechanisms comprise several members or groups of moving parts, some having a reciprocating motion, others a rocking motion, depending on the particular function to be performed. Moreover, the movements of the parts are synchronized so as to act at the proper sequence although not necessarily at the same time.

These several mechanisms are mounted in a frame consisting of a base plate 12 and a hollow vertical column 13 located centrally of the base plate. Extending horizontally above the base plate and through the lower part of the column 13 is a horizontal main cam shaft 14 arranged radially with respect to the turret A. The cam shaft is journalled in bearings 12ª, 12ª located at the front and rear of the base plate (the turret side of the machine being regarded as the front). Mounted on the front end of the cam shaft forwardly of the front bearing 12ª, is a bevel gear 15 meshing with the drive pinion 6 on the drive shaft 1. As will be later pointed out, the beveled gear 15 is connected with the cam shaft by means of clutch mechanism, but in the normal operation of the machine turns with the cam shaft. Mounted on the main cam shaft 14 is a plurality of cams consisting of cam plates and their followers, the latter being operatively connected with one of the moving parts of the several mechanisms before outlined. In most instances, the cam followers are not connected directly with the member actuated thereby, but through a succession of links and levers, the common arrangement being that of connecting the cam follower with a rock shaft mounted on the frame column, said rock shaft carrying one or more levers connected with the moving part through a link, the particular arrangement being varied depending on the nature and direction of the motion to be transmitted. Similarly, the cams are designed to impart the desired movement to the part actuated thereby, some being plate cams and others being box cams, that is, with the cam followers either engaging the periphery of the cam or riding in a groove in one face thereof. Moreover, the contour of the cam and its angular position on the cam shaft is such as to transmit the desired motion at the proper instant or point in the cycle of operation.

With this introduction to the driving cams, the various mechanisms will first be described and their movement traced back to the particular cam which operates them. Beginning with the first mechanism in the order of sequence in the cycle of operation, namely, the bristle separating and transporting mechanism, the same coacts with a bristle magazine or hopper 16 supported in vertical position on one side (right in Figure 2) of the frame column 13, the lower end of which is on the level with and also to the right of the setting head, as that portion of the machine where the bristles are inserted in the brush blanks may be termed. The bristle magazine 16 is merely a vertical receptacle in which the loose bristles in their natural form are piled, although they are previously cut to a uniform length and placed therein so that they all extend in the same direction, namely, from front to rear. The magazine is open at its lower end, although the pile of bristles is at all times held or supported therein by one or the other of two moving members, one being a cut-off hook or blade 17 and the other a reciprocating separator blade 18 (Figures 2 and 5). The cut-off blade consists of an L-shaped arm 17 fixed to the end of a rock shaft 19 extending through the frame column from front to rear and operatively connected with a plate cam 19$^a$ through a follower cam 19$^b$ mounted on said rock shaft. The upper or extreme end of the blade has the form of a fork (Fig. 7) with flat tines 17$^a$—17$^a$ which project crosswise just above the bottom of the magazine, the forward ends of the prongs of the fork-like blade being beveled to points. The separator bar 18 is a flat bar somewhat longer than the width of the machine, and so mounted and actuated as to reciprocate endwise beneath the magazine and likewise to be raised and lowered during its endwise movement. At each end of the separator blade is mounted a carrier block 18$^a$ which in turn is pivotally mounted at the ends of two short lever arms 20—20 mounted on rock shafts 21—21 journalled in bearing brackets 22—22 on opposite sides of the frame column 13, said shafts being provided with longer and downwardly extending lever arms 23—23, joined together at their lower ends by a cross link 24 passing behind the frame column (Figure 7). At one end of the separator bar (left in Figure 2) is a short link 25 connecting it with a straight vertical lever 26 fixed to a rock shaft 27 journalled in brackets 28—28 near the base of the frame column. The rock shaft 27 carries a lever 29 designed for angular adjustment, the same projecting downwardly and connected at its end with a cam follower 30 in the form of a link having a yoke 30$^a$ at its inner end which straddles the cam shaft 14 (Figure 15). Just rearward of the follower 30 is a box cam 31 keyed to the cam shaft 14 and having an irregular groove 31$^a$ cut in the front face thereof, in which rides a roller 30$^a$ journalled on the follower 30. By this arrangement of links and levers a reciprocating motion is imparted to the separator bar coupled with an upward and downward rocking movement at the end of each stroke through the carrier blocks 18$^a$, 18$^a$ carried on the rocking levers 20, 20. For imparting the vertical rocking motion to the separator bar lifting levers 20, 20, a lever 32 is mounted on a long rock shaft 33 journalled in the rear bracket 28 and a front side bracket 34. The lever 32 bears at its upper end through an adjustment screw 32$^a$ against the lower end of the adjacent lever 23, the same being held against the adjusting screw by a coil spring 34 (Figure 7) connecting the horizontal cross link 24 with the frame column 13. A cam follower 35 is also mounted on the rock shaft 33 near its rear end, the same having a cam roller 35$^a$ at its end engaging the periphery of a plate cam 36 just behind the cam 31, and keyed to the cam shaft 14 (Figure 15).

Considering the separator blade 18 further, it will be observed it passes below the bristle magazine and is straddled by the prongs 17$^a$, 17$^a$ of the magazine cut-off block 17. At the central part of the separator blade 18 is a series of upright teeth or prongs 37 resembling the teeth of a comb, which form between them a series of V-shaped notches slightly deeper than one-half the width of the bar,—the number of notches being the same as the number of bristle tufts to be set in the brush, namely, six in this instance, although the number is a matter of choice. Moreover, the separator blade is made in two full length sections, parted vertically as shown in Figure 6, and provided with an internal longitudinally extending central guideway in which is mounted a thin separator blade 38 adapted to move bodily with the separator bar and also to have reciprocating motion relative thereto. The blade 38, however, does not travel the full length of the separator bar, but only in a path along the base of the comb teeth 37, the forward end of the blade 38 having its upper edge tapered to form a sharp point in line with the bottom edge of the blade. The blade 38 is actuated independently of the separator bar 18 by means of a cam and levers similar to those operating said separator bar. At the right end (Figures 5 and 7$^a$) of the bar 18 and in its forward face, is a longitudinal slot 18$^b$. Connected with the adjacent end of the blade by a pin 38$^a$ passing through the slot 18$^b$ is a short link 39 connected with a vertical lever 40 (Figure 2) journalled intermediate its ends on a stub shaft 41 mounted at the laterally extending front bearing bracket 42. The lower portion of the lever 40 is connected with a horizontal link 43 extending inwardly and provided at its inner end with a cam follower $43^a$ (Figures 12 and 13) riding on the cam shaft 14 and provided with a cam roller $43^b$ engaging the periphery of a plate cam 44 just rearwardly or inside of the front cam shaft bearing $12^a$.

The movement imparted to the cut-off blade 17, separator bar 18 and separator blade 38 can be best understood from the illustrative Figures 19 to 29 showing each step in the cycle of operations in which a charge or load of bristles is removed from the magazine just in advance of the actual bristle setting operation. Figures 19 and 20 show in front elevation and vertical section, respectively, these parts at the commencement of a cycle, the pile of bristles $b$ in the magazine 16 being supported by the cut-off blade 17 with the separator blade 18 spaced below the cut-off blade. In the next position (Figures 21 and 22) the cut-off blade 17 is retracted or withdrawn to one side of the magazine and the separator blade 18 is elevated carrying the teeth 37 into the mass of bristles which fill the notches between the teeth 37, these notches being open to their lower extremities inasmuch as the separator blade 38 is retracted. In the next position (Figures 23 and 24) the separator blade 38 is advancing forwardly to the left, forcing its way through the mass of bristles with its lower edge just above the bottom line of the notches between the teeth. By this movement the bristles lodged in the bottoms of the several notches are separated from the mass above and thus from each other in the form of small bundles or wisps $b'$ of about the size required for each individual tuft. At the same time the cut-off blade 17 has begun to move forward but lags behind the separator blade. In the next position (Figures 25 and 26) the separator blade 38 has stopped in its fully elevated position and the cut-off blade 17 is moved forwardly to its full extent just above the line of bristle bundles $b'$, simultaneously forcing the entire mass of bristles clear of the teeth 37 of the separator bar, which now has received its charge of bristles $b'$ and is ready to transport them forward to the bristle setting position, the bristles $b'$ being held firmly in place in the notches by the separator blade 38. Just preceding the forward movement of the separator bar it is depressed and the cut-off blade is elevated slightly as shown in Figures 27 and 28, thus allowing the bar to clear the magazine before starting its endwise movement toward the bristle setting mechanism. And finally, in Figure 29, the separator bar is shown advanced endwise to the left of the magazine and at rest in the bristle setting position, the cut-off blade 17 in the meantime having been depressed to its initial position (as shown in Figure 20) where it remains stationary until the separator bar 18 has been discharged of its load of bristles and returns for another load and a repetition of the next cycle.

The operation of setting the bristles will not be described as yet, although it may be well in order to complete the cycle of movement of the separator bar and its associated parts, to state that immediately after the bristles $b'$ are removed from the bar it is depressed or dropped downwardly a short distance and returned to its starting position under the magazine at the lower level, as shown in Figure 20, and thence lifted into birstle receiving position as already described. It should also be noted that during the return movement of the separator bar 18, the separator blade 38 is also retracted but with a much quicker return motion, so that it is entirely clear of the teeth 37 by the time they are ready to receive the next load of bristles from the magazine.

But before the separator bar and blade can return to the magazine for their next load, the bristle bundles $b'$ must be transferred from the separator bar to a set of fixed notches in which they are held momentarily awaiting the descent of the setting needles and in order that the bristle feeding action will not be delayed. A description of the stationary parts of the bristle setting mechanism will now follow: Referring to Figures 5, 6 and 12, a center block 40 is mounted on the frame column 13 immediately behind the path of the separator bar. This block has a T-head with a forwardly extending overhanging flange 41 provided along its forward edge with an upper needle guide plate 42, a series of vertical needle guide bores $42^a$ being formed between their contacting faces. On the under side of the flange 41 of the T-head block 40 and along its forward edge, is a row of downwardly projecting teeth 44 just rearwardly of the guide bores $42^a$, which form a series of downwardly facing notches,—the complements of the notches in the separator bar. These notches are in vertical alignment with needle guide bores $42^a$ and with the setting needles, and are moreover recessed into the under side of the T-head flange 41 as at $44^a$. Just in front of the row of teeth 44 is a lower needle plate 45 likewise having a series of guide bores $45^a$ in vertical alignment with the upper series of guide bores $42^a$, there being a space between these sets of guide bores in which the bristles are held. Along the top of the setting guide plate 45 are a series of transverse grooves or notches $45^b$ located at the upper ends of each guide bore $45^a$ and in horizontal alignment with the notches between the teeth 44 just behind.

The lower needle guide plate 45 is fixed at the upper end of a vertically movable plate 46 mounted in vertical guides 46ª, 46ª on the front of the T-head block 40. At the lower end of the plate 46 is a cam roller 46ᵇ engaging a plate cam 47 keyed to the cam shaft 14 just beneath the setting head (Figure 12).

Now resuming the discussion of the action from the point where the separator bar 18 has transported the bristle tufts $b'$ to the setting position. As shown in Figure 29, it will be pointed out that the separator bar is lifted upwardly as it reaches the end of its forward stroke so that the bristle tufts $b'$ are carried upwardly into the notches 44ª between the fixed teeth 44 with their rear end portions bent downwardly behind the teeth. At this moment the lower or movable guide plate 45 is elevated and comes to rest against the under side of the upper guide plate 42 thus clamping the tufts $b'$ securely in the notches 45ᵇ along the top edge of said movable guide plate 45. In this position the tufts can now be released by the separator bar which follows the instant the same are clamped, namely, by the retraction of the separator blade 38 (Figures 39 and 40), and finally by the simultaneous depression and retractive movement of the separator bar 18.

Now the bristle tufts are ready for the next operation, namely, the setting into the brush blank. As already stated, this operation consists in driving the several tufts of bristles downwardly through the bores in the guide plates 42 and 45 by means of a set or bank of needles arranged above and in vertical alignment with these guide bores. The needles, however, are preceded by the keys consisting of small rectangular plates cut from strips of flat wire. The needles 48—six in number—are mounted in a vertically reciprocating plunger head 49 in the form of a plate slidably mounted in guideways or gibs 49ª, 49ª on the front face of the frame column 13 near its upper end. The needles consist of steel bars having square bases or portions which are anchored to the lower portion of the plunger head by a clamping plate 49ᵇ (Figure 5). Below the base portions the needles taper down to thin shanks having a sectional contour resembling the Geneva cross; (thus +). At the tips or lower ends of the needles the front and rear webs of the cross-like shank portions are beveled off, leaving a transverse edge (thus −) as shown in Figure 6. It may be stated that the vertical needle bores in the guide plates 42 and 45 are cut to the same contour as the shank portions of the needles, the obvious reason being to give the needles the support necessary to prevent them from being broken. Incidentally, the needles themselves are designed for maximum strength and to avoid frequent displacement. The stroke of the needles is relatively short, namely, the distance required to drive them through the guide plates to the brush blank and return. The reciprocating motion is imparted to the plunger or needle head through a rocking lever 50 (Figures 1 and 8) mounted between brackets 51, 51 at the top of the frame column 13. The forward end of the rocking lever 50 is connected to the upper end of the plunger head by a link 52, and at its rear end to a vertical connecting rod 53 by a yoke 53ª. The lower end of the connecting rod 53 carries a cam follower yoke 54 (Figure 12) having a cam roller 55 engaging a box cam 56 keyed to the cam shaft 14.

Considering now the wire feeding and cut-off mechanism which provides the keys and places them in position to be driven downwardly with the needles. This mechanism is located in the upper part of the hollow frame column and directly behind the needle plunger head 49. The wire $w$ in the form of thin flat strips of brass or like metal is fed from a reel 57 (Figure 1) mounted on an arm 57ª extending rearwardly from the top of the machine frame column. Six strands of this wire are fed forwardly from the reel through the connecting yoke 53ª to a wire feed head 58 pivotally mounted within the column 13 for slight forward and aft tilting motion on a transverse spindle 59 (Figure 8). This wire feed head has the form of a rocking bracket with side walls 58ª and a top wall or guide plate 60 in which grooves are formed for guiding the strands of wire. At the forward end of the top wall is a downturned curved lip 60ᵇ which alters the direction of travel of the wire from a horizontally forward to a vertically downward direction. Extending over the top wall 60 and lip 60ª is a removable cover plate 61. Integral with the wire feeding head 58 are upstanding lugs 62, 62 adjacent the rear edge of the top guide plate 60 and on opposite sides of the wire guiding grooves. These lugs face forwardly and are spaced a short distance behind a fixed abutment flange 63 integral with the machine frame. Coil springs 64 are inserted in horizontal bores 62ª formed in said lugs, the springs bearing against the abutment 63 and coacting to hold the wire guiding head against forward tilting. Mounted at one end of the wire feed head spindle 59 is a lever 65 (Figure 1) connected with a vertical push rod 66, the same being the rearmost of a group of three push rods extending parallel along the right side (Figure 2) of the machine and passing through a guide block 67 fixed to the machine frame. A coil spring 68 is mounted on the rod 66 and anchored by a collar 69, the upper end of the spring bearing against the upper guide block 67 and normally under compression to hold the rod down. The lower end of the push rod 66 is pivotally connected with one end of a bell crank lever 70 (Figures 13 and 14) mounted on a stub shaft 71 supported in the front wall of the machine frame. At the free and lower end of the bell crank lever is a cam roller 70ª engaging the periphery of a plate cam 72 keyed to the cam shaft 14, the same being the rearmost of a group of four somewhat similar plate cams, all operating parts of the wire feed mechanism. These other plate cams (Figures 12 and 13) are indicated as 73, 74 and 75. The plate cams 73 and 74 immediately adjacent the rear cam 72 have the identical arrangement of bell crank lever form of cam followers 76 and 77 and journalled on the same stub shaft 71, although as shown in Figure 14 the contour of the plates varies slightly so as to impart the desired motion. So too, the cams 73 and 74 connected with the vertical push rods 78 and 79, respectively, thus completing with the rod 66 the group of three before mentioned, and all operating alike but connected with different parts.

The foremost of this group of four plate cams, 75, coacts with a bell crank cam follower 80 mounted on a stub shaft 81 located below instead of above the cam shaft 14 (Figures 13 and 14), with its follower roller 80ª engaging the side of the cam and the other arm extending through a slot near the base of the frame column and connected with a vertical push rod 82. This rod extends upwardly and connects with a lever 83 mounted on a rock shaft 84 extending transversely of the frame column some distance below the wire feeding head. Actuated by this rock shaft 84 is a part of the wire cutting mechanism which will presently be described.

Returning now to the group of three vertical push rods 66, 78 and 79, the first having already been identified as connected to the wire guide spindle 59, the other two will now be connected with the parts actuated thereby. The intermediate rod 78 is connected at its upper end with a lever 85 mounted on a transverse rock shaft 86 (Figures 1 and 8) journalled in the side walls of the frame column. Fixed to this rock shaft is a group of six presser fingers 87 projecting forwardly. Coacting with these presser fingers is a like series of wire release levers 88. Before describing the action of these levers, it will be noted that the wire on leaving the top guide plate 60 passes downwardly just to the rear of two vertical guide plates 89 and 90, disposed one above the other and having their rear faces grooved to form guideways for the several strands of wire. Opposite these plates are two sets of levers, the lower set 88 already mentioned being wire gripping and release levers, and the other and upper set 91 being the wire advancing or feeding levers. Both sets of levers 88 and 91 are similar in design, mounting and operation, but it will be observed that the upper set 91 is mounted on the tilting or rocking wire feeding head 58 and therefore movable bodily therewith, whereas the lower set 88 is carried on the frame column and hence does not move bodily.

The levers 88 are metal bars mounted to rock on a pin 92 offset a short distance from the path of the wire. The front edge of each lever is substantially vertical and is reduced to a narrow flange 88ª beveled at its upper end and adapted to enter each of the guide grooves of the fixed guide plate 90 and against the strand of wire therein. Below the flanged edge 88ª is a downwardly and forwardly projecting finger 88ᵇ on which is carried a gripper block 93 with teeth along its forward edge, having their beveled sides inclined downwardly, these gripper blocks being located just below the flanged edges 88ª of the lever. Extending rearwardly from the pivot pin 92 each lever has a finger 88ᶜ the end of which rests upon the tip of the corresponding trip finger on the rock shaft 86, there being a trip finger for each lever. Immediately above the rear ends of the levers 88 is a cylindric spring carrier 94 mounted at its ends in the side walls of the frame column. In this carrier are a series of small coil springs 94ª each one bearing downwardly against the rear end of one of the levers 88 and yieldingly holding the same against its trip finger 87. The upper set of levers 91 are identical in every respect to the lower set 88, except as before stated the pin 95 on which they are mounted is carried by the wire guide feed head 58.

The rear ends of the levers 91 are engaged by trip fingers 96 mounted on a rock shaft 97 journalled in the wire feeding head 58 and operatively connected with the third and foremost push rod 79 by means of a curved lever arm 98 (Figure 1). A set of coil springs 99 bear on the rear ends of the levers 91 from above, these springs being carried in the lower edge of a depending flange 60ª integral with the wire feed head 58. The levers 91 also have a set of wire gripper blocks 91ª similar to those, 93, of the lower set of levers 88. Thus as clearly shown in Figure 8, the function of these several gripping devices is to intermittently feed the several strands of wire downwardly to the cutting-off mechanism just below (Figure 12), not more than 1/8 of an inch of the wire being advanced with each cycle of operation.

A single cycle of operation of the wire feeding mechanism will be understood from the following: Assuming that the parts are momentarily at rest in the positions shown in Figure 8, the operation is to feed the strands downwardly for the next series of keys to be cut from the ends. The forward and downward feeding of the strands is accomplished by the forward rocking motion or tilting of the wire feeding head 58 aided by the two sets of wire feed levers 88 and 91 which function alternately to grip and release the wire. At the start of the feeding movement, the lower set of levers 88 is in released position and the upper set of levers 91 is gripping the wire. Thus upon the forward tilting of the wire feeding head the wire is drawn forwardly from the reels and advanced downwardly, held fast by the upper set of gripping levers which tilt with the feeding head. As soon as this forward tilting is completed, the lower set of levers 88 is tripped and they now grip the wire while the upper set 91 is released, thus allowing the wire feeding head to rock back to its normal position, the strands of wire remaining fast until the next cycle takes place. Thus by intermittent rocking of the wire feeding head 58 through its rock shaft 59 and the alternate tripping of the sets of levers 88 and 91 through their trip fingers 87 and 96, the strands of wire are fed downward into the path of the wire cutting member located just below the wire feeding mechanism (Figures 5 and 6). Here the strands of wire pass between a pair of vertical guide plates 100 and 101 which terminate just above the top surface of the T-head block 40, the forward of these guide blocks having a beveled cutting edge 100$^a$ at its bottom spaced a short distance above the top face of the flange 41 of said T-head block. In this space is mounted a horizontally reciprocating flat cutter bar 102 (Figures 6$^a$ and 12) connected at its rear end to a link 103 which is pivotally connected in turn to a bell crank lever 104 mounted on a rock shaft 105. The bell crank lever 104 connects with a vertical link 106 having a cam follower 107 and roller 107$^a$ at its lower end engaging a box cam 108 mounted on the cam shaft 14. The path of movement of the cutter blade 102 is from a point just rearwardly of the fixed cutting edge 100$^a$ of the guide block 100 (Figure 6) to the vertical path of the setting needles 48, and since each strand of wire $w$ is in exact alignment with the path of one of the needles and is fed downwardly in vertical plane immediately behind each needle into the path of the cutting blade 102, rectangular pieces $w'$ are cut from the ends of the strands which are carried forward on edge and deposited in the path of the setting needles.

Additional means, however, are necessary to guide these rectangular pieces or keys $w'$ forward and to place them properly into setting position (Figures 5, 6 and 7). Extending longitudinally of the top face of the T-head block 40 is a pair of guide bars 109, 109 (Figure 7) between which the cutter bar 102 slides. These guide bars extend forwardly beyond the vertical plane of the needles and support an upper and lower guide plate 110 and 111 projecting forwardly and spaced apart by the guide bars 109, 109 to which they are secured by screws 112 (Figure 5). The upper guide plate 110 is provided with a series of needle guides 110$^a$ just above the upper needle guide plate 42.

Between the two guide plates 110 and 111 is a set of six endwise sliding bars 113 in horizontal alignment with the cutter bar 102. These bars are secured at their lower ends to a reciprocating frame 114 consisting of two side bars 114$^a$ sliding endwise in ways formed just outside of the guide bars 109 and along the side edges of the T-head block 40. Extending transversely between the forward ends of the side frame members 114, 114 is a cross member 115 consisting of a vertical plate with blocks 115$^a$ at each end to which the ends of the side bars are bolted, and also carrying journal pins 116 connected with links 117 extending rearwardly on either side of the T-head block and connected with rocking levers 118 adjacent the rear of the frame column (Figure 12). These rocking levers are mounted on the rock shaft 84 heretofore identified as actuated by plate cam 75, cam followers 80, push rod 82 and rocker arm 83 (Figures 1, 13 and 14) whereby a backward and forward reciprocating movement is imparted to the sliding frame and the bars 113.

Referring further to the bars 113, it will be observed that they are connected with the sliding frame 114 through the plate 115 for a limited endwise movement relative thereto, by providing narrow neck portions 113$^a$ adjacent their outer ends and which fit into notches 115$^a$ along the upper edge of the plate, the length of the neck portions being slightly greater than the thickness of the plate, thus permitting an appreciable relative movement between the two. This movement, however, is controlled by a tension plate 119 fixed to the outer face of the plate 115 and having a series of spring fingers 119$^a$ (Figure 6) bearing against the ends of the bars 113. Thus the bars are yieldingly held against movement relative to the sliding frame which actuates them, but are capable of being displaced slightly against the tension of the spring fingers 119$^a$ by pressure exerted at their inner ends, which are slotted and notched longitudinally and transversely at 113$^b$ to conform to the front half section of the several needles 46; (thus T). Incidentally, the notched ends 113$^b$ of the bars 113 are in vertical alignment with the needle guide bores 42$^a$ in the guide block 42 just below, when the bars are at the extremity of their forward stroke and pushed forward by the spring fingers 119$^a$ as shown in Figures 6 and 7.

To understand the function of the plunger bars 113, the operation of the cutting blade will have to be recalled. As already explained, a series of six keys $w'$ are cut from the lower ends of the strands of flat wire $w$, with each forward stroke of the cutting blade 102. Generally speaking, therefore, the function of the bars 113 is to precede the cutting blade forward just after the keys have been cut, and to hold them in upright position during their forward movement and to hold them stationary in the path of the setting needles for an instant just prior to their descent for the setting operation. This perhaps will be more clearly brought out by describing the setting operation with the aid of the diagrammatic Figures 30, 32, 34, 36 and 38. Beginning with Figure 32, the bristle tufts $b'$ have been placed in position below the guide bars in upper needle guide plate 42, although only a single tuft and the needle is shown, the bristle tufts having been transported from the magazine and deposited by the separator bar 18 in the manner already described. It may also be assumed for the time being that a brush blank C is simultaneously brought to a position below the lower needle guide 45 by the carrier 5 and held firmly in position with one row of six holes therein in perfect vertical alignment with the set of needles 48.

Figure 32:
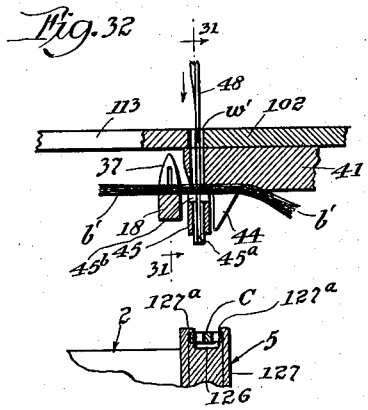
Figure 33:
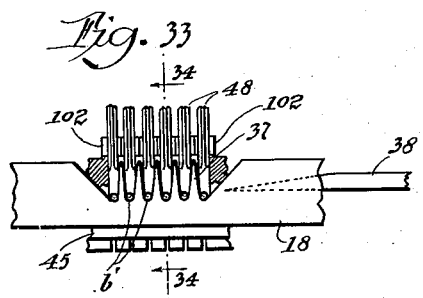
Figure 34:
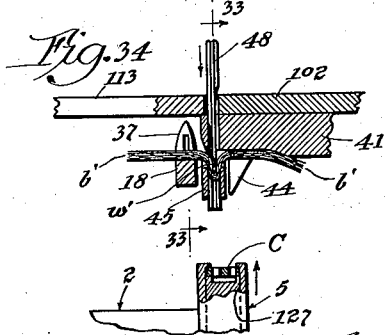
Figure 35:
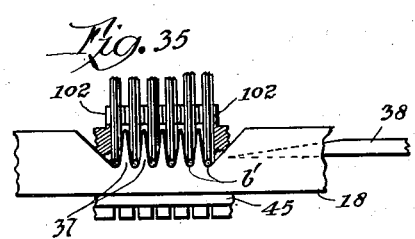
Figure 36:
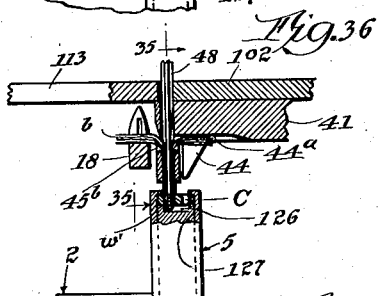
Figure 37:
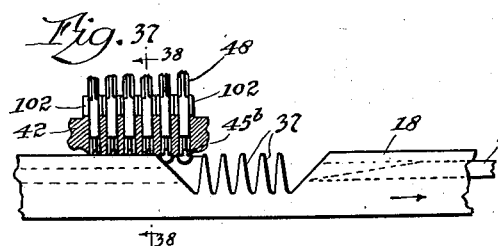
Figure 38:
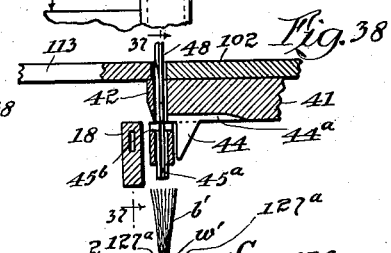

Thus in Figure 30, the needle 48 is being driven downwardly and about to engage the top edge of the key $w'$ which has been brought forward between the cutting blade 102 and the bars 113. Figure 32 shows the needle 48 just engaging the key $w'$, still held by the bars 113 and blade 102 and about to be carried downwardly through the guide bores ahead of the needle. Figure 34 shows the key $w'$ driven downwardly in contact with the bristle tuft $b'$ and the same about to start its downward movement through the lower guide plate 45 looped about the key. Figure 36 shows the tuft driven through the lower guide plate 45 and into the hole in the brush blank C, the same in the meantime having been lifted bodily by the carrier 5 so that it abuts flush with the bottom of said guide plate. In this operation the key $w'$ is embedded in the material of the blank and crosswise of the hole in which the base or loop of the bristle has been forced by the driving action of the needles. And finally, Figure 38 shows the needle 42 being retracted in an upward direction, the carrier 5 being depressed with the blank C with a complete row of bristle tufts $b'$ set therein and the cutting blade 102 and follower bars 113 about to slide rearward as soon as the ends of the needle clear their path. This completes the setting operation and there only remains the action of the blank carriers 5 in automatically presenting successive blanks to the bristle setting mechanism.

Referring now to the blank carriers 5 spaced about the periphery of the turret 2 (Figures 3, 12, 18 and 19), the same comprises vertically movable blocks 120 slidably mounted in vertical guides 121 formed integral with an upwardly projecting flange $2^a$ surrounding the turret. Extending vertically of the guides and immediately behind each block is a bolt 122 passing downwardly through a lug $121^a$ integral with the guide 121. Surrounding the bolt is a coil spring 123 bearing against the underside of the lug $121^a$ (Figure 12). At the lower end of the bolt is mounted the carrier block 120, the same having laterally projecting lug $120^a$ near its lower end into which the end of the bolt is threaded and against which the lower end of the coil spring bears. Thus the bolt 122 and carrier block 120 are movable vertically but normally held in depressed position by the spring 123. Just below the lug $120^a$ and at the extreme lower end of the carrier block 120 is a cam roller 124 journalled on a pin $120^b$. Keyed to the cam shaft 14 is a plate cam 125 in the vertical plane of the roller 124, said cam operating to lift each carrier block bodily during the interval that the turret is stationary with successive carriers in bristle setting position, as will presently be more fully described.

As shown in Figures 12 and 18, the top face of the carrier block has a longitudinal recess 126 into which the head portion of the brush blank is inserted endwise and from the left (Figure 18), this recess being accurately dimensioned so that the blanks will occupy a predetermined position to bring the bristle receiving holes in perfect vertical alignment with the setting needles above. In order to grip the blanks and hold them firmly in the recesses, a pair of spring actuated gripper plates 127, 127 are slidably mounted on opposite sides of block 120 and provided at their upper edges with laterally and upwardly projecting gripper fingers $127^a$. These plates lie in vertical guideways in the sides of the block 120 and are connected with an intermediate sliding plate 128 mounted in a centrally disposed slot in the block, said central and gripper plates 128 and 127 forming a unit capable of a limited vertical movement relative to the block 120 supporting them. At one vertical edge of the block 120 (Figure 18) is a wedge-shaped slot 129 in which is mounted a release lever 130 turning on a pin 131 and extending crosswise of the slot. The lever has a short arm $130^a$ engaging a notch $128^a$ in the adjacent edge of the central plate 128 of the gripper assembly and a long arm $130^b$ extending downwardly along the edge of the block 120. Below the central plate 128 is a transverse cavity or bore 132 formed in the block 120 in which is mounted a spring actuated plunger 133 bearing against the lower arm $130^b$ of the lever 130 and acting normally to hold the lever in a position to depress the gripper plates 127, as clearly shown in Figure 17. Thus it will be seen that by pressing inwardly on the arm $130^b$ of the release lever 130, the gripper fingers $127^a$ are elevated to permit the brush blanks to be inserted and removed, but otherwise act to hold the blanks securely in the carrier. Manifestly the blanks are held fast in the carrier 5 during the bristle setting operation, the finished brushes being removed and a blank inserted in each carrier as it reaches the loading position just in advance of the bristle setting position. The inserting or feeding of the blanks and the removal of the finished brushes may be either accomplished by hand or by automatic feeding devices, but since the latter are not essential to the operation of bristle setting mechanism, no specific form of blank feeding device is shown.

The relative positions of the blank carrier and the bristle setting mechanism are clearly shown in Figures 32, 34, 36 and 38. In the first position (Figure 32) the carrier is in its depressed position; in the second position (Figure 34) the carrier is being elevated as the setting needles are descending; in the third position (Figure 36) the carrier block is at its full height forcing the blank against the lower guide plate 45; and in the last position (Figure 38) the carrier is depressed to its normal position with the bristle tuft set in the blank carried thereby and turret 2 about to move forward to bring the next carrier into setting position.

This completes the discussion of the essential features of the machine, together with the description of the arrangement and operation of the various mechanisms which contribute to the major operations of setting the bristles in the brush. In the practical operation of the machine, however, certain safety appliances are desirable in order to interrupt the operation should anything go wrong. Hence, means are provided for throwing out the setting mechanism if for any reason a brush blank should not be inserted into one of the carriers or improperly inserted therein, it being manifest that in the first case the bristles would be merely discharged onto the carrier, but in the second case the needles are quite likely to be broken and some part of the machine damaged. To prevent this, a clutch is introduced between the cam shaft 14 and driving gear 15 which is normally in clutching position but operatively connected with a trip mechanism including a detector mounted in the path of the turret and more particularly in the path of the handles of the blanks, the detector actuating the trip mechanism to release the clutch should there be an empty carrier or anything irregular in the position of the blank in any of the carriers. This clutch and trip mechanism will now be briefly described (Figures 1, 2, 13 and 16).

Immediately behind the driving gear 15 is a plate cam 134 fixed to the gear and mounted to turn loosely therewith on the cam shaft. Just beyond the plate cam 134 is a clutch disc 135 fixed to the cam shaft 14 and carrying on its front face a clutch latch 136 of a somewhat crescent shape and pivotally mounted intermediate its ends on a pin 135$^a$ adjacent the periphery of the disc 135. One end of the latch projects a short distance beyond the periphery of the disc in the form of a trip finger 136$^a$ and the other end terminates within the periphery and is acted upon by a coil spring 137 anchored at its opposite end on a pin 135$^b$ anchored in the face of the plate, said spring extending at right angles to the latch. Between the latch pivot pin 135$^a$ and the spring restrained end of the latch and in the edge toward the cam shaft, is a notch 136$^b$ forming a recess engaging a clutch pin 138 carried by the plate cam 134 and projecting therefrom into the path of the clutch latch. In the normal operation of the machine the pin 138 is engaged by clutch latch 136, thereby connecting the driving pinion 15 to the cam shaft through the cam 134, pin 138, latch 136 and clutch disc 135, the latter as already stated being fixed to the cam shaft. On the other hand, by tripping the clutch latch 136 so as to release the pin 138, the driving pinion 15 would merely rotate freely on the cam shaft and the entire setting mechanism would stop.

The tripping of the clutch latch is accomplished by trip mechanism acting on the trip finger 136$^a$ of the clutch latch 136 and comprises a lever 139 mounted adjacent its lower end on a stub shaft 140 projecting forwardly from the front cam shaft bearing 12$^a$ on the right and below the clutch disc 135 (Figure 16). At the upper end of the lever 139 is a trip roller 139$^a$ lying in the plane of the clutch latch 136. At the extreme lower end of the lever 139 and below the stub shaft 140 is an adjustable set screw 141 bearing at its end against a fixed pin 142 and normally holding the lever 139 in substantially vertical position, with the trip roller just out of the path of the revolving trip finger 136$^a$ of the clutch latch. Also mounted on the stub shaft 140 and just forwardly of the trip lever 139, is a trip cam follower 143 in the form of a horizontal rock shaft having one arm extending laterally beneath the cam shaft 14 and carrying a cam roller 143$^a$ at its end (Figure 2) adapted to engage the edge of the plate cam 134 fixed to the gear 15, said cam having a sector 134$^a$ of increased radius of somewhat more than a 90° arc. The roller is held in contact with the cam by a coil spring 144 connected with the cam follower just below the shaft 140, and anchored to the machine frame just below the roller 143$^a$. The other arm of the cam follower 143 projects laterally in the opposite direction and carries at its end a trip plate 143$^b$ (Figure 17) having a projecting square end. Immediately above the cam plate 143$^b$ is a trip latch 145 pivotally mounted at the upper end of the trip lever 139 just opposite the trip roller 139$^a$. This trip latch has a downwardly extending arm 145$^a$ provided with a right angled notch 145$^b$ adapted to fit the upper corner of the trip plate 143ª. The trip latch also has a finger 145ᶜ extending laterally outward in a horizontal direction and passing through a slotted vertical link 146 supported at its lower end on a bracket 147 and having pin and slot connection therewith to allow a limited vertical endwise movement of the link. The upper end of the link 146 is pivotally connected with a trip control lever 148 consisting of a relatively short L-shaped horizontal arm 148ª to the end of which said link 146 is attached, and a longer vertical arm 148ᵇ, the lever being pivotally mounted on a horizontal stub shaft 149 mounted at the outer end of the bearing bracket 42. At the upper end of the arm 148ᵇ is a detector roller 150 rotative about a vertical axis and lying in the path of the turret 2, and more particularly in the path of the blank carriers 5 as shown in Figure 2.

From the foregoing description it will be seen that during the normal operation of the machine, the trip cam follower 143 is constantly actuated with a rocking motion by the plate cam 134, the outer or free end thereof being depressed when its roller engages the sector 134ª of said cam and elevated when in contact with the remaining portion of its periphery of reduced and constant diameter. It will be observed, however, that the cam follower is depressed during the period that the setting operation is in progress and while the turret is momentarily at rest, and is elevated while the turret is travelling from one position to the next. Similarly, the detector roller 150 during the setting operation is bearing against the brush carrier next to be brought into bristle setting position, so that as it moves forward the detector roller rides along the edge of the handle of the blank C projecting rearwardly from the carrier (Figure 3). Now, if it should happen that there was no blank in the particular carrier opposite the detector roller, it would drop forwardly toward the turret thus allowing the trip control lever 148 to rock in the same direction with a consequent downward dropping of the link 147 holding the trip latch normally in raised position. Hence, the lowering of the trip latch would bring the depending notched finger into contact with the cam follower 143, which at that instant would be elevated, with the result that the lever 139 would be swung inwardly toward the cam shaft bringing the roller 139ª into the path of the trip finger 136ª of the clutch latch 136, thus releasing the pin 138 from the clutch latch 136 and disengaging the pinion 15 from the cam shaft 14. This, of course, would stop the entire operation of the machine, except the rotation of the turret which would present the empty carrier to the bristle setting position and then proceed to the next position without the functioning of the setting mechanism.

Now assuming that the next carrier contains a brush blank, the detector roller 150 would be actuated thereby to lift the trip latch to its normal position and withdraw the trip lever from the path of the clutch latch with the result that the clutch members are reset, so that pin 138 engages the clutch latch 136 at the same point in its rotation where it was released. In this manner the relative movement of the turret and the bristle setting mechanism is not disturbed; in other words, the bristle setting mechanism simply skips one cycle during which the empty or defective carrier passes through the bristle setting station and the machine is immediately thereafter thrown automatically into operation again without causing a delay or necessitating the presence of an operator to start the machine. In this manner the machine is protected against faulty feeding operations, but without necessitating a complete shutdown to correct the difficulty, since it is taken care of automatically by detecting the presence of trouble and interrupting the operation until the defective carrier has passed the bristle setting position.

I claim:

1. In a brush making machine, the combination of bristle setting mechanism, a vertical magazine containing loose bristles, an endwise and vertically reciprocating separator bar moving between said bristle setting mechanism and a loading position beneath said magazine, said bar having teeth adapted to be filled with bristles from the bottom of said magazine during its upward movement in loading position, and means for confining tufts of bristles between said teeth.

2. In a brush making machine, the combination of a vertical magazine adapted to contain a supply of loose straight bristles, a vertically actuated separator bar beneath said magazine having upwardly facing teeth adapted to be projected into the bristles at the lower end of the magazine above, and means coacting with said bar for confining a predetermined number of bristles in each of the notches between said teeth.

3. In a brush making machine, the combination of a vertical bristle magazine adapted to contain a mass of loose bristles, a separator bar movable upwardly and downwardly from a loading position beneath said magazine and having a row of teeth adapted to enter the mass of bristles at the bottom of said magazine in the upward movement of said bar in the loading position thereof, and means carried by said separator bar for separating a predetermined number of bristles from the mass in said magazine and confining the same at the base of the notches between said teeth in said separator bar prior to its downward movement from said magazine.

4. In a brush making machine, the combination of a bristle magazine adapted to contain a supply of loose bristles, a separator bar movable to and from a loading position beneath said magazine and vertically upwardly and downwardly toward the bottom of said magazine in said loading position, said bar having a row of upwardly extending teeth adapted to project into the mass of bristles in the lower end of said magazine in the upward movement thereof, and means carried by said separator bar for confining tufts of bristles between said teeth, and means coacting with said separator bar for holding the mass of bristles in said magazine during the downward movement of said bar.

5. In a brush making machine, the combination of a vertical magazine adapted to contain a mass of loose bristles, a separator bar movable into and out of bristle-loading position beneath said magazine and having a row of upwardly projecting teeth having notches therebetween, said magazine and bar having relative vertical movement whereby said teeth enter the mass of bristles at the bottom of said magazine and withdrawn therefrom, and a reciprocating blade carried by said bar and movable transversely of said teeth to confine tufts of bristles therebetween and prior to the withdrawal of said bar from said magazine.

6. In a brush making machine, the combination of a vertical magazine adapted to contain a supply of loose bristles, a separator bar movable into and out of bristle-loading position beneath said magazine, and having a row of upwardly projecting teeth adapted to be projected into the mass of bristles at the bottom of said magazine in loading position, a cut-off bar normally supporting the mass of bristles in said magazine and adapted to be retracted from its supporting position during the loading of said separator bar, and a separator blade movable endwise of said separator bar and above the base of said notches and acting to confine the tufts of bristles therein.

7. In a brush making machine, the combination with bristle setting mechanism, of a vertical magazine adapted to contain a mass of loose bristles, an endwise movable separator bar having a row of upwardly projecting teeth adapted to travel between said bristle setting mechanism and a loading position beneath said magazine, said separator also having a transverse reciprocating movement toward and from the bottom of said magazine during the loading operation, a cut-off blade normally closing the bottom of said magazine and shiftable from closing position during the transverse movement of said separator bar whereby said teeth enter the mass of bristles at the bottom of the magazine, a separator blade carried by said separator bar and operative to confine a predetermined number of bristles between each of said teeth and to separate the same from the mass of bristles above.

8. In a brush making machine, the combination of bristle setting mechanism, a vertical bristle magazine, bristle setting needles, means for successively feeding brush blanks to said bristle setting mechanism, and means for feeding tufts of bristles from said magazine to said bristle setting mechanism comprising an endwise reciprocating separator bar, having a series of upwardly projecting teeth moving between said bristle setting mechanism and a loading position beneath said magazine, means for imparting a vertical movement to said separator bar in said loading position whereby said teeth enter and are retracted from the bristles at the bottom of said magazine, means carried by said separator bar for confining tufts of bristles between said teeth and for releasing the same when said separator bar has returned to said bristle setting mechanism.

9. In a brush making machine, the combination of bristle setting mechanism, means for advancing successive brush blanks to said setting mechanism, and means for simultaneously feeding tufts of straight bristles to said setting mechanism comprising a vertical bristle magazine located adjacent said setting mechanism, an endwise reciprocating bar having a series of upright teeth travelling between an unloading position adjacent said setting mechanism and a loading position beneath said magazine, means operative in bristle loading position to introduce and retract said teeth into the mass of bristles at the bottom of said magazine, means acting to secure tufts of said bristles between said teeth during the movement of said bar to said setting mechanism and to release the same in unloading position, and means for transferring said bristles from said bar to said setting mechanism.

10. In a brush making machine, the combination of a vertically reciprocating plunger head, a row of setting needles mounted in said head and projecting downwardly therefrom, a fixed guide plate located below said plunger head and provided with guide bores in vertical alignment with said needles, a vertically movable guide plate below said fixed guide plate and having complementary guide bores, and a row of notches in the upper face thereof extending transversely of said row of needles and in line with said guide bores, said fixed guide plate having a row of notches on its under side in transverse alignment with the notches of said movable guide plate and offset to one side thereof, and means for feeding tufts of bristles between said fixed and movable guide plates to be held by the notches thereof in the path of said needles during the downward setting stroke thereof.

11. In a brush making machine, the combination of a reciprocating plunger head, a row of setting needles mounted in said head, a plate positioned in the path of said needles and having a series of guide bores in alignment therewith, means for feeding tufts of straight bristles into a position transversely of entrance to each guide bore, means for feeding brush blanks against the under side of said guide plate, the same having recesses in line with said needles whereby said tufts are folded double and driven through said bores in advance of said needles, the looped ends of said tufts being carried into the recesses of said blank.

12. In a brush making machine, the combination of a reciprocating plunger head, a series of setting needles mounted in said head, a needle guide plate having guide bores in the path of said needles, means for feeding tufts of straight bristles into the path of said needles and above said plate, means for feeding bristle locking members into the path of said needles above said bristles, and means for feeding brush blanks against the under side of said guide plate, the same having recesses in line with said needles whereby said locking members are driven through said plate carrying said bristles in loop form into said recesses.

13. In a brush making machine, the combination of a plunger head, a series of bristle setting needles mounted in said plunger head, a bristle magazine, means for automatically removing a predetermined quantity of bristles from said magazine, arranging the same into straight tufts and transporting the same into the path of said setting needles, guide plates having bores in alignment with said needles, means acting to hold said tufts between said guide plates, a reciprocating cutting blade, means for feeding wire into the path of said cutting blades to provide bristle locking keys, means for transporting the keys into the path of said needles and above said tufts of bristles, and means for feeding brush blanks into setting position beneath said guide plates.

14. In a brush making machine, the combination with bristle setting mechanism including a row of vertically reciprocating needles, of a bristle magazine, a separator bar movable endwise from said bristle setting mechanism to a loading position beneath said magazine and having a row of upwardly projecting teeth with V-shaped notches therebetween, a separator blade carried by said separator bar and having endwise reciprocating movement relative thereto, said separator bar also having vertical reciprocating movement in loading position whereby said teeth are projected into the mass of bristles at the bottom of said magazine, a separator blade carried by said separator bar and having endwise reciprocating movement transversely of said teeth to confine tufts of bristles therebetween for transportation by said blade to said bristle setting mechanism and into alignment with said needles, needle guide plates above and below the unlocking portions of said bristles, one of said plates being movable to grip said tufts of bristles, the same being simultaneously released from said separator bar by the retractive movement of said separator blade and the depression and shifting of said separator bar toward its loading position beneath said magazine.

15. In a brush making machine, the combination of a vertically reciprocating plunger head, a row of setting needles mounted in said head and projecting downwardly therefrom, a fixed guide plate located below said plunger head and provided with guide bores in vertical alignment with said needles, a vertically movable guide plate below said fixed guide plate and having complementary guide bores and a row of notches in the upper face thereof extending transversely of said row of needles and in line with said guide bores, said fixed guide plate having a row of notches on its under side in transverse alignment with the notches of said movable guide plate and offset to one side thereof, means for feeding rows of bristles into the path of the needles on the downward stroke of said plunger head comprising a bristle magazine located on one side of said plunger head, a separator bar movable endwise from the path of said needles to a loading position beneath said magazine and having a row of upwardly projecting teeth, means for elevating and depressing said separator bar in its loading position to carry said teeth into and out of the mass of bristles at the bottom of said magazine, a reciprocating separator blade carried by said separator bar and operative to confine tufts of bristles between said teeth during the depression of said separator bar in its loading position and endwise shifting movement toward the path of said needles, means for elevating said separator bar to bring said bristles in alignment with the rows of notches on said guide plates, means for depressing said lower guide plate during the positioning of said bristles whereby the same is elevated to grip said bristles, said separator blade being operative to simultaneously release said bristles and said separator bar to shift downwardly and thence endwise toward its loading position.

16. In a brush making machine, the combination of a vertical magazine adapted to contain a supply of loose straight bristles and open at its bottom, a separating bar movable edgewise to and from a loading position adjacent the bottom of said magazine and provided with a row of upwardly projecting teeth, means for elevating and retracting said bar when in loading position whereby said teeth are forced into the mass of bristles in said magazine, and a blade carried by said separator bar and movable transversely of said teeth to separate a predetermined number of bristles from the mass in the magazine and to confine them between said teeth.

17. In a brush making machine, the combination with bristle setting mechanism, of a magazine adapted to contain a supply of loose bristles, a separator bar movable endwise between said bristle setting mechanism and a loading position adjacent said magazine and having a row of teeth projecting toward said magazine, means for actuating said bar to and from said magazine when in loading position whereby said teeth enter the mass of bristles in said magazine, a cut-off member normally holding said bristles in said magazine and shiftable to permit the bristles to fill the spaces between said teeth, and a blade carried by said bar and shiftable transversely of said teeth to confine tufts of bristles in the spaces between said teeth.

18. In a brush making machine, the combination of a plunger head having a row of downwardly projecting setting needles, a block below said plunger head having a row of guide bores in vertical alignment with said needles, a horizontally reciprocating cutter-bar on top of said block and movable toward and from said row of needle guide bores, means for feeding strands of flat wire vertically downward into the path of said cutter bar, a series of follower bars, means for imparting a reciprocating movement to said follower bars and coacting with said cutter bar to support the severed ends of said wire on edge in their movement from the point of severance to positions in the path of said needles, and means for feeding tufts of bristles into the path of said needles.

19. In a brush making machine, the combination of a plunger head having a row of downwardly projecting setting needles, a block below said plunger head having a row of guide bores in vertical alignment with said needles, a horizontally reciprocating cutter bar on top of said block and movable toward and from said row of needle guide bores, means for feeding strands of flat wire vertically downward into the path of said cutter bar during its movement toward the path of said needles, a reciprocating follower bar adapted to follow substantially the movement of said cutter bar to support the severed ends of said wire on edge in their movement from the point of severance to positions in the path of said needles, and means for simultaneously feeding tufts of bristles into the path of said needles and below said guide bores.

20. In a brush making machine, the combination of a vertically reciprocating plunger head, a row of setting needles carried by said plunger head, a fixed plate below said plunger head having a row of needle guide bores therein, a reciprocating cutter bar moving horizontally above said plate toward and from said guide bores, wire feeding mechanism comprising vertical wire guides, a rocking feed head acting to intermittently feed the strands of wire into the path of said cutter bar, a reciprocating follower coacting with said cutter bar to transport the severed ends of the wire on edge into the path of said needles, and means for feeding tufts of straight bristles into the path of said needles.

21. In a brush making machine, the combination of a vertically reciprocating plunger head, a row of setting needles carried by said plunger head and having blunt ends elongated in the direction of the row, a fixed plate below said plunger head having needle guide bores of substantially the same sectional contour as said needles, a reciprocating cutter bar moving horizontally on said plate toward and from said guide bores, wire feeding mechanism adjacent said plunger head, comprising a series of reels on which strands of flat wire are wound, vertical wire guides in alignment with each of said needles, a rocking feed head acting to intermittently feed the strands of wire into the path of said cutter bar including gripper fingers acting to alternately grip and release said strands of wire, said cutter bar simultaneously cutting the ends from said strands and transporting the same forwardly into the path of said needles, a reciprocating follower coacting with said cutter bar to maintain the severed end of the wire on edge during their forward movement and in position to be engaged by the needles and driven through said guide bores, and means for simultaneously feeding tufts of straight bristles and brush blanks into the path of said needles.

22. In a brush making machine, the combination of a vertically reciprocating plunger head carrying a row of bristle setting needles, a turret revolving in a horizontal plane provided about its periphery with a plurality of equidistantly spaced blank carriers, means for imparting an intermittent stop motion to said turret to bring said carriers successively beneath said plunger head, means for feeding individual tufts of straight bristles into the path of said needles, and means coacting with said needles for looping said tufts preparatory to setting in said blanks.

23. In a brush making machine, the combination of a vertically reciprocating plunger head carrying a row of bristle setting needles, a turret revolving in a horizontal plane and provided about its periphery with a plurality of equidistantly spaced blank carriers, means for imparting an intermittent stop motion to said turret to bring said carriers successively beneath said plunger head, bristle feeding mechanism comprising a bristle magazine, and means for automatically removing successive parcels of straight bristles from said magazine, arranging them into individual tufts, and transporting them into the path of said needles, and means coacting with said needles for looping said tufts preparatory to setting in said blanks.

24. In a brush making machine, the combination of a vertically reciprocating plunger head carrying a row of bristle setting needles, a turret revolving in a horizontal plane and provided about its periphery with a plurality of equidistantly spaced blank carriers, means for imparting an intermittent stop motion to said turret to bring said carriers successively beneath said plunger head, bristle feeding mechanism comprising a bristle magazine, and means for automatically removing successive parcels of straight bristles from said magazine, arranging them into individual tufts, and transporting them into the path of said needles, means for simultaneously feeding metallic locking members into the path of said needles in advance of their down stroke, and means coacting with said needles whereby said locking members engage said tufts between their ends, bending the same in loop form and setting the same into said blanks.

25. In a brush making machine, the combination of a vertically reciprocating plunger head carrying a row of bristle setting needles, a revolving turret provided about its periphery with a plurality of equidistantly spaced blank carriers, means for bringing said carriers successively to rest beneath said plunger head, bristle feeding mechanism comprising a bristle magazine, and means for automatically removing successive parcels of straight bristles from said magazine, arranging them into individual tufts and transporting them into the path of said needles, means for simultaneously feeding metallic locking members into the path of said needles and above said tufts, and a needle guide plate located between said tufts and said blank carriers and provided with guide bores through which said locking members and tufts in loop form are driven by said needles and set into said blanks.

26. In a brush making machine, the combination of brush feeding mechanism comprising a rotative turret, a plurality of blank carriers spaced equidistantly about its periphery, a vertically reciprocating plunger head positioned above the path of said brush carriers and carrying a row of bristle setting needles, means for imparting a stop motion to said turret to bring said carriers to rest in bristle setting position below said plunger head, a guide plate between said plunger head and said carriers, means for feeding tufts of straight bristles into the path of said needles in advance of each bristle setting stroke thereof, and means acting to bring said plate and carriers into contact with each other during each bristle setting stroke of said needles.

27. In a brush making machine, the combination of brush blank feeding mechanism comprising a rotative turret having a plurality of holding blank carriers spaced equidistantly about its periphery and mounted for vertical movement relative thereto, a vertically reciprocating plunger head positioned above the path of said blank carriers and carrying a row of setting needles, means for imparting an intermittent stop motion to said turret to bring said carriers successively into the path of said needles, a fixed plate between said plunger head and said carriers and provided with guide bores in vertical alignment with said needles, means for feeding tufts of bristles into the path of said needles and above said plate, and means for lifting said carriers into bristle setting position against said plate.

28. In a brush making machine, the combination of brush blank feeding mechanism comprising a rotative turret having a plurality of equidistantly spaced blank carriers about its periphery, a drive shaft, gearing driven from said drive shaft for imparting an intermittent stop motion to said turret whereby each carrier is successively advanced to a bristle setting position, a plunger head mounted adjacent said turret and above the said bristle setting position thereof, means for imparting a vertical reciprocating motion to said plunger head including a cam shaft driven from said drive shaft, a clutch interposed between said drive and cam shafts, and trip mechanism operatively connected with said clutch and including a detector positioned in the path of the carriers and in advance of bristle setting position and adapted to detect the presence of a blank therein, and means for resettting said trip mechanism after said clutch has been released to permit a single advance movement of said turret, during which a defectively loaded carrier is carried through its bristle setting position without the operation of said plunger head.

Signed at Chicago, Ill., this 3 day of October, 1927.

EVERARD R. LINDSTROM.